US012218959B2

(12) United States Patent
Moore et al.

(10) Patent No.: US 12,218,959 B2
(45) Date of Patent: Feb. 4, 2025

(54) EFFICIENT THREAT CONTEXT-AWARE PACKET FILTERING FOR NETWORK PROTECTION

(71) Applicant: Centripetal Networks, LLC, Portsmouth, NH (US)

(72) Inventors: Sean Moore, Hollis, NH (US); Jonathan R. Rogers, Hampton Falls, NH (US); Vincent Mutolo, Portsmouth, NH (US); Peter P. Geremia, Portsmouth, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

(21) Appl. No.: 18/380,016

(22) Filed: Oct. 13, 2023

(65) Prior Publication Data

US 2024/0154977 A1     May 9, 2024

Related U.S. Application Data

(63) Continuation of application No. 18/084,366, filed on Dec. 19, 2022, now Pat. No. 11,824,875, which is a
(Continued)

(51) Int. Cl.
*H04L 29/06* (2006.01)
*H04L 9/40* (2022.01)

(52) U.S. Cl.
CPC ...... *H04L 63/1416* (2013.01); *H04L 63/0245* (2013.01); *H04L 63/1425* (2013.01); *H04L 63/1466* (2013.01); *H04L 63/166* (2013.01)

(58) Field of Classification Search
CPC ............ H04L 63/1416; H04L 63/0245; H04L 63/1425; H04L 63/1466; H04L 63/166;
(Continued)

(56) References Cited

U.S. PATENT DOCUMENTS 6,098,172 A     8/2000   Coss et al.
6,147,976 A    11/2000   Shand et al.
(Continued)

FOREIGN PATENT DOCUMENTS

AU    2005328336 B2    9/2011
AU    2006230171 B2    6/2012
(Continued)

OTHER PUBLICATIONS

W. Meng, W. Li and L. F. Kwok, "Towards Effective Trust-Based Packet Filtering in Collaborative Network Environments," in IEEE Transactions on Network and Service Management, vol. 14, No. 1, pp. 233-245, Mar. 2017, doi: 10.1109/TNSM.2017.2664893. (Year: 2017).*

(Continued)

*Primary Examiner* — Ka Shan Choy
(74) *Attorney, Agent, or Firm* — Banner & Witcoff, Ltd.

(57) ABSTRACT

A threat intelligence gateway (TIG) may protect TCP/IP networks from network (e.g., Internet) threats by enforcing certain policies on in-transit packets that are crossing network boundaries. The policies may be composed of packet filtering rules with packet-matching criteria derived from cyber threat intelligence (CTI) associated with Internet threats. These CTI-derived packet-filtering rules may be created offline by policy creation and management servers, which may distribute the policies to subscribing TIGs that subsequently enforce the policies on in-transit packets. Each packet filtering rule may specify a disposition that may be applied to a matching in-transit packet, such as deny/block/drop the in-transit packet or pass/allow/forward the in-transit packet, and also may specify directives that may be applied to a matching in-transit packet, such as log, capture, spoof-tcp-rst, etc. Often, however, the selection of a rule's dispo-
(Continued)

sition and directives that best protect the associated network may not be optimally determined before a matching in-transit packet is observed by the associated TIG. In such cases, threat context information that may only be available (e.g., computable) at in-transit packet observation and/or filtering time, such as current time-of-day, current TIG/network location, current TIG/network administrator, the in-transit packet being determined to be part of an active attack on the network, etc., may be helpful to determine the disposition and directives that may best protect the network from the threat associated with the in-transit packet. The present disclosure describes examples of methods, systems, and apparatuses that may be used for efficiently determining (e.g., accessing and/or computing), in response to the in-transit packet, threat context information associated with an in-transit packet. The threat context information may be used to efficiently determine the disposition and/or one or more directives to apply to the in-transit packet. This may result in dispositions and/or directives being applied to in-transit packets that better protect the network as compared with solely using dispositions and directives that were predetermined prior to receiving the in-transit packet.

30 Claims, 10 Drawing Sheets

Related U.S. Application Data continuation of application No. 17/866,208, filed on Jul. 15, 2022, now Pat. No. 11,552,970, which is a continuation of application No. 17/695,047, filed on Mar. 15, 2022, now Pat. No. 11,444,963, which is a continuation of application No. 17/508,596, filed on Oct. 22, 2021, now Pat. No. 11,316,876, which is a continuation of application No. 17/235,544, filed on Apr. 20, 2021, now Pat. No. 11,159,546.

(58) Field of Classification Search
CPC .............. H04L 63/0254; H04L 63/0227; H04L 63/0263; H04L 63/1408
See application file for complete search history.

(56) References Cited

U.S. PATENT DOCUMENTS

| | | | |
|---|---|---|---|
| 6,226,372 B1 | 5/2001 | Beebe et al. | |
| 6,279,113 B1 | 8/2001 | Vaidya | |
| 6,317,837 B1 | 11/2001 | Kenworthy | |
| 6,484,261 B1 | 11/2002 | Wiegel | |
| 6,611,875 B1 | 8/2003 | Chopra et al. | |
| 6,662,235 B1 | 12/2003 | Callis et al. | |
| 6,826,694 B1 | 11/2004 | Dutta et al. | |
| 7,089,581 B1 | 8/2006 | Nagai et al. | |
| 7,095,716 B1 | 8/2006 | Ke et al. | |
| 7,107,613 B1 | 9/2006 | Chen et al. | |
| 7,143,438 B1 | 11/2006 | Coss et al. | |
| 7,152,240 B1 | 12/2006 | Green et al. | |
| 7,215,637 B1 | 5/2007 | Ferguson et al. | |
| 7,225,269 B2 | 5/2007 | Watanabe | |
| 7,227,842 B1 | 6/2007 | Ji et al. | |
| 7,237,267 B2 | 6/2007 | Rayes et al. | |
| 7,263,099 B1 | 8/2007 | Woo et al. | |
| 7,296,288 B1 | 11/2007 | Hill et al. | |
| 7,299,353 B2 | 11/2007 | Le Pennec et al. | |
| 7,331,061 B1 | 2/2008 | Ramsey et al. | |
| 7,478,429 B2 | 1/2009 | Lyon | |
| 7,539,186 B2 | 5/2009 | Aerrabotu et al. | |
| 7,610,621 B2 | 10/2009 | Turley et al. | |
| 7,684,400 B2 | 3/2010 | Govindarajan et al. | |
| 7,710,885 B2 | 5/2010 | Ilnicki et al. | |
| 7,721,084 B2 | 5/2010 | Salminen et al. | |
| 7,792,775 B2 | 9/2010 | Matsuda | |
| 7,814,158 B2 | 10/2010 | Malik | |
| 7,814,546 B1 | 10/2010 | Strayer et al. | |
| 7,818,794 B2 | 10/2010 | Wittman | |
| 7,913,303 B1 | 3/2011 | Rouland et al. | |
| 7,954,143 B2 | 5/2011 | Aaron | |
| 8,004,994 B1 | 8/2011 | Darisi et al. | |
| 8,009,566 B2 | 8/2011 | Zuk et al. | |
| 8,037,517 B2 | 10/2011 | Fulp et al. | |
| 8,042,167 B2 | 10/2011 | Fulp et al. | |
| 8,117,655 B2 | 2/2012 | Spielman | |
| 8,176,561 B1 | 5/2012 | Hurst et al. | |
| 8,209,756 B1 * | 6/2012 | Guruswamy | ....... H04L 63/1466 713/188 |
| 8,306,994 B2 | 11/2012 | Kenworthy | |
| 8,307,029 B2 | 11/2012 | Davis et al. | |
| 8,495,725 B2 | 7/2013 | Ahn | |
| 8,510,821 B1 | 8/2013 | Brandwine et al. | |
| 8,578,489 B1 | 11/2013 | Dubrovsky et al. | |
| 8,726,379 B1 | 5/2014 | Stiansen et al. | |
| 8,806,638 B1 | 8/2014 | Mani | |
| 8,832,832 B1 | 9/2014 | Visbal | |
| 8,856,926 B2 | 10/2014 | Narayanaswamy et al. | |
| 8,935,785 B2 | 1/2015 | Pandrangi | |
| 9,094,445 B2 | 7/2015 | Moore et al. | |
| 9,124,552 B2 | 9/2015 | Moore | |
| 9,137,205 B2 | 9/2015 | Rogers et al. | |
| 9,154,446 B2 | 10/2015 | Gemelli et al. | |
| 9,160,713 B2 | 10/2015 | Moore | |
| 9,172,627 B2 | 10/2015 | Kjendal et al. | |
| 9,419,942 B1 | 8/2016 | Buruganahalli et al. | |
| 10,333,898 B1 | 6/2019 | Moore et al. | |
| 10,503,899 B2 | 12/2019 | Moore et al. | |
| 10,673,890 B2 | 6/2020 | Lee et al. | |
| 2001/0039579 A1 | 11/2001 | Trcka et al. | |
| 2001/0039624 A1 | 11/2001 | Kellum | |
| 2002/0016858 A1 | 2/2002 | Sawada et al. | |
| 2002/0038339 A1 | 3/2002 | Xu | |
| 2002/0049899 A1 | 4/2002 | Kenworthy | |
| 2002/0112188 A1 | 8/2002 | Syvanne | |
| 2002/0164962 A1 | 11/2002 | Mankins et al. | |
| 2002/0165949 A1 | 11/2002 | Na et al. | |
| 2002/0186683 A1 | 12/2002 | Buck et al. | |
| 2002/0198981 A1 | 12/2002 | Corl et al. | |
| 2003/0018591 A1 | 1/2003 | Komisky | |
| 2003/0035370 A1 | 2/2003 | Brustoloni | |
| 2003/0051026 A1 | 3/2003 | Carter et al. | |
| 2003/0097590 A1 | 5/2003 | Syvanne | |
| 2003/0105976 A1 | 6/2003 | Copeland | |
| 2003/0120622 A1 | 6/2003 | Nurmela et al. | |
| 2003/0123456 A1 | 7/2003 | Denz et al. | |
| 2003/0142681 A1 | 7/2003 | Chen et al. | |
| 2003/0145225 A1 | 7/2003 | Bruton et al. | |
| 2003/0154297 A1 | 8/2003 | Suzuki et al. | |
| 2003/0154399 A1 | 8/2003 | Zuk et al. | |
| 2003/0188192 A1 | 10/2003 | Tang et al. | |
| 2003/0212900 A1 | 11/2003 | Liu et al. | |
| 2003/0220940 A1 | 11/2003 | Futoransky et al. | |
| 2004/0010712 A1 | 1/2004 | Hui et al. | |
| 2004/0015719 A1 | 1/2004 | Lee et al. | |
| 2004/0073655 A1 | 4/2004 | Kan et al. | |
| 2004/0088542 A1 | 5/2004 | Daude et al. | |
| 2004/0093513 A1 | 5/2004 | Cantrell et al. | |
| 2004/0098511 A1 | 5/2004 | Lin et al. | |
| 2004/0123220 A1 | 6/2004 | Johnson et al. | |
| 2004/0151155 A1 | 8/2004 | Jouppi | |
| 2004/0172529 A1 | 9/2004 | Culbert | |
| 2004/0172557 A1 | 9/2004 | Nakae et al. | |
| 2004/0177139 A1 | 9/2004 | Schuba et al. | |
| 2004/0193943 A1 | 9/2004 | Angelino et al. | |
| 2004/0199629 A1 | 10/2004 | Bomer et al. | |
| 2004/0205360 A1 | 10/2004 | Norton et al. | |
| 2004/0250124 A1 | 12/2004 | Chesla et al. | |
| 2005/0010765 A1 | 1/2005 | Swander et al. | |
| 2005/0024189 A1 | 2/2005 | Weber | |
| 2005/0071650 A1 | 3/2005 | Jo et al. | |
| 2005/0108557 A1 | 5/2005 | Kayo et al. | |
| 2005/0114704 A1 | 5/2005 | Swander | |

(56) References Cited

U.S. PATENT DOCUMENTS

| | | |
|---|---|---|
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0229246 A1 | 10/2005 | Rajagopal et al. |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |
| 2007/0211644 A1 | 9/2007 | Ottamalika et al. |
| 2007/0240208 A1 | 10/2007 | Yu et al. |
| 2008/0005795 A1 | 1/2008 | Acharya et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2009/0028160 A1 | 1/2009 | Eswaran et al. |
| 2009/0052443 A1 | 2/2009 | Kolenchery et al. |
| 2009/0077621 A1 | 3/2009 | Lang et al. |
| 2009/0138938 A1 | 5/2009 | Harrison et al. |
| 2009/0150996 A1 | 6/2009 | Haswell |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0262741 A1 | 10/2009 | Jungck et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0132027 A1 | 5/2010 | Ou |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0185055 A1 | 7/2011 | Nappier et al. |
| 2011/0238855 A1 | 9/2011 | Korsunsky et al. |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0106354 A1 | 5/2012 | Pleshek et al. |
| 2012/0113987 A1 | 5/2012 | Riddoch et al. |
| 2012/0240135 A1 | 9/2012 | Risbood et al. |
| 2012/0264443 A1 | 10/2012 | Ng et al. |
| 2012/0311692 A1* | 12/2012 | Ebina .................. H04L 63/0236 726/13 |
| 2012/0314617 A1 | 12/2012 | Erichsen et al. |
| 2012/0331543 A1 | 12/2012 | Bostrom et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0254766 A1 | 9/2013 | Zuo et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215574 A1 | 7/2014 | Erb et al. |
| 2014/0247786 A1 | 9/2014 | Izu et al. |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0366132 A1 | 12/2014 | Stiansen et al. |
| 2015/0007314 A1 | 1/2015 | Vaughan |
| 2015/0033336 A1 | 1/2015 | Wang et al. |
| 2015/0106930 A1 | 4/2015 | Honda et al. |
| 2015/0135325 A1* | 5/2015 | Stevens ............... H04L 63/1425 726/25 |
| 2015/0237012 A1 | 8/2015 | Moore |
| 2015/0244734 A1 | 8/2015 | Olson et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0065611 A1 | 3/2016 | Fakeri-Tabrizi et al. |
| 2016/0112443 A1 | 4/2016 | Grossman et al. |
| 2016/0119365 A1 | 4/2016 | Barel |
| 2016/0191558 A1 | 6/2016 | Davison |
| 2016/0205069 A1 | 7/2016 | Blocher et al. |
| 2016/0212171 A1 | 7/2016 | Senanayake et al. |
| 2016/0218933 A1 | 7/2016 | Porras et al. |
| 2016/0219065 A1 | 7/2016 | Dasgupta et al. |
| 2016/0285706 A1 | 9/2016 | Rao |
| 2016/0294870 A1 | 10/2016 | Banerjee et al. |
| 2016/0366099 A1 | 12/2016 | Jordan |
| 2017/0099310 A1 | 4/2017 | Di Pietro et al. |
| 2017/0223046 A1 | 8/2017 | Singh |
| 2018/0159883 A1 | 6/2018 | Ahn et al. |
| 2019/0007454 A1* | 1/2019 | Nimmagadda ......... H04L 47/24 |
| 2020/0267176 A1 | 8/2020 | Asher et al. |
| 2020/0351244 A1 | 11/2020 | Moore et al. |
| 2021/0112091 A1 | 4/2021 | Compton |
| 2022/0060448 A1 | 2/2022 | White |
| 2022/0159036 A1* | 5/2022 | Tsirkin ............... H04L 63/0263 |

FOREIGN PATENT DOCUMENTS

| | | |
|---|---|---|
| CA | 2600236 A1 | 10/2006 |
| EP | 1006701 A2 | 6/2000 |
| EP | 1313290 A1 | 5/2003 |
| EP | 1484884 A2 | 12/2004 |
| EP | 1677484 A2 | 7/2006 |
| EP | 2385676 A1 | 11/2011 |
| EP | 2498442 A1 | 9/2012 |
| EP | 1864226 B1 | 5/2013 |
| EP | 3284238 A1 | 2/2018 |
| KR | 20010079361 A | 8/2001 |
| WO | 2005046145 A1 | 5/2005 |
| WO | 2006093557 A2 | 9/2006 |
| WO | 2006105093 A2 | 10/2006 |
| WO | 2007109541 A2 | 9/2007 |
| WO | 2011038420 A2 | 3/2011 |

(56) References Cited

FOREIGN PATENT DOCUMENTS

| | | |
|---|---|---|
| WO | 2012146265 A1 | 11/2012 |
| WO | 2015/160357 A1 | 10/2015 |
| WO | 2017120051 A1 | 7/2017 |
| WO | 2019092711 A1 | 5/2019 |
| WO | 2021003014 A1 | 1/2021 |

OTHER PUBLICATIONS

U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al., "The Secure Shell (SSH) Transport Layer Protocol," SSH Communication Security Corp, Network Working Group RFC 4253, Jan. 2006, 32 pages.
Sommer, et al., "Enhancing byte-level network intrusion detection signatures with context," Proceedings of the 10th ACM conference on Computer and communications security, 2003.
Jul. 22, 2022—(WO) International Search Report and Written Opinion—App PCT/US2022/025375, 26 pages.
Juniper, "Example: Using Firewall Filter Chains", Jan. 26, 2021, Retrieved from the Internet: <<https://web.archive.org/web/20210516174320/https://www.juniper.net/documentation/us/en/software/junos/routing-policy/topics/example/firewall-filter-option-filter-chain-example.html>>, retrieved on Jul. 14, 2022, 8 pages.
Meng, et al., "Towards Effective Trust-Based Packet Filtering in Collaborative Network Environments," IEEE Transactions on Network and Service Management, vol. 14, No. 1, Mar. 2017, pp. 233-245, 13 pages.
Aug. 26, 2022 (EP) Communication with European Search Report, App EP22169106, 8 pages.
Feb. 15, 2024 (EP)—Communication with European Search Report—App EP23193876, 11 pages.
Popa, et al., "Building Extensible Networks with Rule-Based Forwarding," OSDI, 2010, 14 pages.
Jun. 23, 2021 (US)—Notice of Allowance—U.S. Appl. No. 17/235,544.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
A. Feldmann et al., "Tradeoffs for Packet Classification", Proceedings of the IEEE Infocom, 397-413, 2000.
A. Hari et al., "Detecting and Resolving Packet Filter Conflicts", Proceedings of IEEE Infocom, 1203-1212, 2000.
Acharya et al., "Optwall: A Hierarchical Traffic-Aware Firewall," Department of Computer Science, Telecommunications Program, University of Pittsburgh, pp. 1-11 (2007).
Bellion, "High Performance Packet Classification", http://www.hipac.org (available as of Jul. 12, 2018, however exact publication date unknown).
Blake, et al., "An Architecture for Differentiated Services," Network Working Group RFC 2475, Dec. 1998, 36 pages.
C. Benecke, "A Parallel Packet Screen for High Speed Networks", Proceedings of the 15th Annual Computer Security Applications Conference, 1999.
Chen, et al., "Research on the Anomaly Discovering Algorithm of the Packet Filtering Rule Sets," Sep. 2010, First International Conference on Pervasive Computing, Signal Processing and Applications, pp. 362-366.

D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35, 1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDs for Packet Filtering," Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al., "Definition of the Differentiated Services Field (DS Field) in the IPv4 and IPv6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.

(56) References Cited

OTHER PUBLICATIONS

P. Warkhede et al., "Fast Packet Classification for Two-Dimensional Conflict-Free Filters", Proceedings of IEEE Infocom, 1434-1443, 2001.

Palo Alto Networks; "Designing a Zero Trust Network With Next-Generation Firewalls"; pp. 1-10; last viewed on Oct. 21, 2012.

Perkins, "IP Encapsulation with IP," Network Working Group RFC 2003, Oct. 1996, 14 pages.

R. Funke et al., "Performance Evaluation of Firewalls in Gigabit-Networks", Proceedings of the Symposium on Performance Evaluation of Computer and Telecommunication Systems, 1999.

R. Rivest, "On Self-Organizing Sequential Search Heuristics", Communications of the ACM, 19(2): 1976.

R.L. Graham et al., "Optimization and Approximation in Deterministic Sequencing and Scheduling: A Survey", Annals of Discrete Mathematics, 5: 287-326, 1979.

Reumann, John; "Adaptive Packet Filters"; IEEE, 2001, Department of Electrical Engineering and Computer Science, The University of Michigan, Ann Arbor, MI.

S,M. Bellovin et al., "Network Firewalls", IEEE Communications Magazine, 50-57, 1994.

S. Goddard et al., "An Unavailability Analysis of Firewall Sandwich Configurations", Proceedings of the 6th IEEE Symposium on High Assurance Systems Engineering, 2001.

S. Suri et al., "Packet Filtering in High Speed Networks", Proceedings of the Symposium on Discrete Algorithms, 969-970, 1999.

Singh, Rajeev et al. "Detecting and Reducing the Denial of Service attacks in WLANs", Dec. 2011, World Congress on Information and Communication TEchnologies, pp. 968-973.

Sourcefire 3D System User Guide, Version 4.10, Mar. 16, 2011, 2123 pages.

Tarsa et al., "Balancing Trie-Based Policy representations for Network Firewalls," Department of Computer Science, Wake Forest University, pp. 1-6 (2006).

\* cited by examiner

EFFICIENT THREAT CONTEXT-AWARE PACKET FILTERING FOR NETWORK PROTECTION

CROSS-REFERENCE TO RELATED APPLICATIONS

The present application is a continuation of U.S. patent application Ser. No. 18/084,366, filed Dec. 19, 2022, which is a continuation of U.S. patent application Ser. No. 17/866, 208, filed Jul. 15, 2022, which is a continuation of U.S. patent application Ser. No. 17/695,047, filed Mar. 15, 2022, which is a continuation of U.S. patent application Ser. No. 17/508,596, filed Oct. 22, 2021, which is a continuation of U.S. patent application Ser. No. 17/235,544, filed Apr. 20, 2021 and issued as U.S. Pat. No. 11,159,546 on Oct. 26, 2021, each hereby incorporated by reference herein as to its entirety.

FIELD

Aspects described herein generally relate to computer hardware and software and network security. In particular, one or more aspects of the disclosure generally relate to computer hardware and software for efficient filtering of in-transit packets that determines an action to be performed (e.g., a disposition and/or a directive) for each in-transit packet (for example, whether to block or allow each in-transit packet) depending on the threat context at the time that the in-transit packet is observed. Other aspects and other features are also described herein.

BACKGROUND

Transmission Control Protocol/Internet Protocol (TCP/IP) network security is becoming increasingly important as the information age continues to unfold. Network threats/attacks may take a variety of forms (e.g., unauthorized requests or data transfers, viruses, malware, large volumes of traffic designed to overwhelm resources, and the like).

To counter these threats and attacks, various cyber defense methodologies and systems have been developed and deployed. An important component of cyber defense is the network appliance (e.g., a packet-filtering appliance) that applies sets of packet filtering rules to in-transit Layer 3/Internet Protocol (L3/IP) packets and determines whether to allow/forward each packet toward its destination or block/drop the packet. These packet-filtering appliances may be inserted inline into links located at the boundaries between a private network, such as an enterprise network, and the public Internet and may be configured with a set of packet filtering rules, or a policy, that may be designed to protect or otherwise secure the private network in some way. For example, early-generation network firewalls are typically configured with packet filtering rules that enforce a private network's access control policies, such as which Internet services (i.e., well-known ports associated with Internet hosts) that internal hosts may be allowed to access, and conversely which internal resources may be accessed by which (unsolicited) Internet hosts. For another example, current-generation packet-filtering appliances include threat intelligence gateways (TIGs), which may be configured with packet filtering rules with packet matching criteria that correspond to the network addresses, e.g., IP addresses, 5-tuple values, domain names, URIs, and the like, of cyber threats that have been identified by cyber threat intelligence (CTI) providers.

Although there are no required formal standards for packet filtering rule syntax and semantics, packet-filtering appliances typically support packet filtering rules that generally conform to this high-level, exemplary representative schema: <disposition><directives><matching-criteria>; <metadata>, where: <disposition> is, for example, one of block/deny/drop (which will generally be referred to herein as "block") or allow/pass/forward (which will generally be referred to herein as "allow") a packet that matches the rule; the <matching-criteria> correspond to Internet-layer (L3), transport-layer (L4), and application-layer header field values, such as some combination of source and destination IP addresses, protocol, source and destination ports, domain names, Uniform Resource Identifiers (URIs) such as Uniform Resource Locators (URLs) or Uniform Resource Names (URNs), and the like; and <metadata> is information associated with the rule that may be used to inform applications about the packet and/or rule, for example, the metadata may indicate the source of the matching criteria and may be included in an associated log that may be processed by, for example, applications for cyber situational awareness, cyber analysis, cyber defense, cyber network protection, and the like. The <directives> may be signals that direct the operating application logic of the packet-filtering appliance to process a matching packet according to the logic associated with the directive. For example, this logic may be additional packet-processing actions and/or policy-processing actions that may be applied to a matching packet (e.g., signaled by directives such as "log", "flow-log", "capture", "mirror", "re-direct", "spoof-tcp-rst", etc.), whether or not/conditionally to apply the rule upon packet ingress ("in") or upon packet egress ("out") or both ("in out"), whether or not/conditionally to continue applying subsequent rules in the policy to the matching packet ("continue" or "quick"), associating the rule with specific interfaces of the packet-filtering appliance, etc.

One approach to cyber defense is to filter packets associated with Internet threats, which are Internet hosts and/or resources managed by Internet hosts that may be associated with malicious activity. These threats may be researched and identified by cyber threat intelligence (CTI) provider organizations, which publish CTI reports on the threats. The CTI reports may include threat indicators, which may be network addresses in the form of IP addresses, 5-tuples, domain names, URIs, and the like, associated with Internet hosts and/or resources that may be participating in malicious activity. The threat indicators may be collected from multiple CTI provider organizations and used to create sets/policies composed of packet filtering rules with matching criteria that correspond to the threat indicators. Such packet filtering rules generated from threat indicators are hereafter referred to as "threat indicator rules", and a set of threat indicator rules comprises a "CTI-based policy" for protecting a network from Internet threats. Packet filtering appliances located at boundaries between networks to be protected (e.g., private networks) and networks that may not be protected (e.g., public networks such as the Internet) may be configured with these policies and may apply them to all in-transit packets traversing the boundaries, thereby protecting the private network from Internet threats by, for example, blocking/dropping packets associated with the threats. Because a gateway is an interface at a boundary between two different networks, such as between a CTI-protected network and an unprotected network, such packet filtering appliances that are configured with CTI-based policies and logic to enforce the policies may be called Threat Intelligence Gateways (TIGs).

Although this CTI-based cyber defense approach may appear to be straightforward, for several reasons it is not. One reason is that the threat risk associated with a threat indicator may not be deterministic in the sense that, for example, an in-transit packet with a header field value that matches a threat indicator may not necessarily be associated with malicious activity and instead may be associated with legitimate business activity or with some benign activity. For example, a website hosting service may use a single IP address to host multiple domains. One of the domains may be involved in malicious activity whereas the other domains are only involved in legitimate activity. A CTI provider may detect the malicious activity associated with the one malicious domain but may publish the single IP address of all of the domains as a threat indicator; furthermore, the CTI provider may assign/associate high confidences, high risk scores, recommended dispositions (e.g., "block"), and/or the like to such threat indicators. Consumers of such CTI and associated threat indicators may consider it to be undesirable, and may desire to exclude such CTI before applying it. Furthermore, what is to be excluded may be relative/contextual to a given consumer. For example, an enterprise may subscribe to a CTI Provider's threat indicator feeds but may discover that the enterprise's own networked hosts and resources are listed as threat indicators because, for example, the hosts may have been compromised by malware and/or malicious actors.

Thus, when creating a threat indicator rule, the consumer may not select the "block" disposition by default, even when the associated CTI provider may be, for example, recommending "block" with high confidence, because of the possibility of blocking legitimate business traffic. This may have the effect of falsely designating a real attack on the network as a non-threat, thereby potentially allowing, rather than blocking, the attack. Conversely, other more risk-averse consumers may choose not to select the "allow" disposition (and with packet-processing actions/directives configured to monitor the potential threat) by default because of the possibility of allowing malicious traffic that attacks and damages networked resources, which may be considered a false negative. Additionally, there are other reasons that a consumer may be uncertain as to whether to select the "block" or "allow" disposition despite a CTI provider's published recommendations, and there are other reasons that the disposition (block or allow) that may best protect the network may not be readily determined when creating threat indicator rules comprising a network protection policy that are intended to be applied to future packets yet to be received.

Accordingly, when the threat risk associated with a threat indicator is uncertain, subjective, and/or probabilistic (e.g., risk probability in the range of [0, 1]) in nature vs. deterministic, objective, or binary (i.e., an "all risk" risk probability=1 or a "no risk" risk probability=0) in nature, then it may be problematic to predetermine the disposition, i.e., "block" or "allow", for a threat indicator rule. Similarly, it may be problematic to predetermine any directives for the threat indicator rule, as these directives are often correlated with the disposition, with the risk associated with the threat indicator, and/or with other factors.

Thus, there is a need for improvements in network-protective computer logic and technology associated with the application of threat indicator rules to in-transit packets traversing boundaries between protected networks and public networks such as the Internet. These improvements would be directed toward improving cyber defenses against Internet threats.

SUMMARY

The following presents a simplified summary in order to establish a baseline understanding of some aspects of the disclosure. It is intended neither to identify key or critical elements of the disclosure nor to delineate the scope of the disclosure. The following summary merely presents some concepts of the disclosure in a simplified form as a prelude to the detailed description below.

According to some aspects as described herein, the determination of a disposition (e.g., "block" or "allow") of a threat indicator rule as well as the determination of one or more directives to be applied to an in-transit packet, may be delayed until the in-transit packet has been observed that matches the threat indicator rule. Based on observing a rule-matching packet (e.g., in response to and/or after receiving or observing the packet) by a packet filtering appliance, the packet filtering appliance's logic may efficiently compute, access, and/or otherwise determine threat context information that may not have been available, applicable, or otherwise known at the time the threat indicator rule was created. Such threat context information may be used as input to logic that determines the disposition, e.g., block or allow, as well as the directives to apply to the in-transit packet. This may result in dispositions and/or directives being applied to in-transit packets that better protect the network as compared with solely using dispositions and directives that were predetermined prior to receiving the in-transit packet. Threat context information that may be used to determine an in-transit packet's disposition and directives may include, for example, the packet observation/filtering time, the location and/or administrator of the associated packet-filtering appliance, and/or whether or not the packet is associated with an active attack on the associated network and/or on other networks connected to the Internet.

Accordingly, at the time that threat indicator rules are created/generated, a new disposition may be specified for a threat indicator rule. For purposes of convenience and example only, this new disposition will be referred to herein as a "protect" disposition, however this new disposition may be assigned any name as desired, such as "undefined," "neutral," "TBD," and/or any other name as desired. Alternatively, a rule may be assigned no disposition and/or directives at all (e.g., a null, blank, or missing disposition and/or directive), and based on the missing disposition and/or directive the network appliance's logic may determine (e.g., compute) a disposition and/or one or more directives using threat context information associated with the observed in-transit packet. In further examples, the rule may be assigned a first disposition (e.g., "block," "allow," etc.) and/or first one or more directives, and based on the observed in-transit packet and based on the threat context information, the network appliance's logic may determine (e.g., compute) a different second disposition and/or a different second one or more directives. In still further examples, a rule may be assigned a "block" disposition or an "allow" disposition (or any other disposition), and may also be assigned or otherwise associated with an indicator, such as a flag or signal, that indicates that threat context information is to be used for that rule at in-transit packet observation time. An example of such an indicator may be a simple one-bit flag, for example, where one value of the indicator signals to a TIG or other packet filtering appliance that the assigned disposition is correct and another value of the indicator signals to the TIG or other packet filtering appliance that the assigned disposition is flexible and/or that a disposition is to be computed at in-transit packet observation time. In any of these situations, upon receiving and observing an in-transit packet that matches a rule indicating no predetermined disposition (e.g., a rule with a "protect" disposition, or a rule with a missing/blank disposition, or a rule having the above-discussed indicator), a packet filtering appliance (for example, a TIG) may use threat context information to efficiently compute the disposition to be actually applied to the packet, for example "block" or "allow", as well as one or more directives that may best protect the network from the associated threat, and then may apply the computed disposition and directive(s) to the in-transit packet. The efficient determination (e.g., computation) and application of the disposition and/or directives for the in-transit packet may be completed before processing/filtering the next in-transit packet and/or before the next in-transit packet is received by the packet filtering appliance. Accordingly, the computation and application may be sufficiently efficient such that regardless of packet transmission rates and associated traffic loads, the in-transit packets may be processed/filtered without incurring undue latencies and/or packet drops that may otherwise meaningfully affect performance of the associated networked applications.

Further aspects described herein are directed to receiving, by a packet-filtering appliance from one or more cyber threat intelligence providers, one or more threat indicators; determining a plurality of packet-filtering rules associated with the one or more threat indicators; configuring the packet-filtering appliance with the plurality of packet-filtering rules; receiving an in-transit packet; determining that the in-transit packet matches a rule of the plurality of packet-filtering rules; determining, based on the rule, threat context information that was not predetermined before the receiving the in-transit packet; determining a disposition and/or one or more directives based on the threat context information; and applying the disposition and/or one or more directives to the in-transit packet.

Further aspects described herein are directed to receiving, by a packet-filtering appliance from one or more cyber threat intelligence providers, one or more threat indicators; determining a plurality of packet-filtering rules associated with the one or more threat indicators; configuring the packet-filtering appliance with the plurality of packet-filtering rules; receiving an in-transit packet; determining, based on a rule, of the plurality of rules, that matches the in-transit packet, that threat context information is to be determined; determining the threat context information, wherein the threat context information was not predetermined before the receiving the in-transit packet; determining a disposition based on the threat context information; and applying the disposition to the in-transit packet.

Further aspects described herein are directed to receiving, by a packet-filtering appliance, a plurality of packet-filtering rules, wherein the packet-filtering rules were determined based on a plurality of threat indicators that were determined based on cyber intelligence reports from a plurality of cyber threat intelligence provider; configuring the packet-filtering appliance with the plurality of packet-filtering rules; receiving, from a first network, an in-transit packet destined to a second network; based on determining that the in-transit packet matches a first packet-filtering rule of the plurality of packet-filtering rules, determining threat context information; determining, based on the threat context information, a disposition; and applying the disposition to the in-transit packet. Non-limiting examples of the threat context information may include one or more of any of the following: in-transit packet observation time, appliance location and/or appliance identifier/ID, administrator and/or associated security policy preferences, type of network being protected and/or type of network associated with the in-transit packet, active threat or active attack type associated with the in-transit packet, an indication of whether the in-transit packet is a member of an active multi-packet, multi-flow attack (and/or information about such an attack), flow origination of the in-transit packet, flow direction of the in-transit packet, flow state of the in-transit packet, flow connection state of the in-transit packet, global threat context, domain name associated with (e.g., identified by) the in-transit packet, popularity of the domain name, registration status of the domain name, URI associated with the in-transit packet, data transfer protocol method associated with (e.g., identified by) the in-transit packet, protocol risk associated with the in-transit packet, and/or contextual CTI noise, etc.

Further aspects described herein are directed to receiving, by a packet-filtering appliance, a plurality of packet-filtering rules, wherein the packet-filtering rules were determined based on a plurality of threat indicators that were determined based on cyber intelligence reports from a plurality of cyber threat intelligence provider; configuring the packet-filtering appliance with the plurality of packet-filtering rules; receiving, from a first network, an in-transit packet destined to a second network; based on determining that the in-transit packet matches a first packet-filtering rule of the plurality of packet-filtering rules, wherein the first packet-filtering rule indicates no predetermined disposition to be applied to a matching packet, determining threat context information; determining, based on the threat context information, a disposition; and applying the disposition to the in-transit packet. The threat context information may be based on various information available after the in-transit packet is observed, for example being based on an observation time of the in-transit packet. Non-limiting examples of the threat context information may include one or more of any of the following: in-transit packet observation time, appliance location and/or appliance identifier/ID, administrator and/or associated security policy preferences, type of network being protected and/or type of network associated with the in-transit packet, active threat or active attack type associated with the in-transit packet, an indication of whether the in-transit packet is a member of an active multi-packet, multi-flow attack (and/or information about such an attack), flow origination of the in-transit packet, flow direction of the in-transit packet, flow state of the in-transit packet, flow connection state of the in-transit packet, global threat context, domain name associated with (e.g., identified by) the in-transit packet, popularity of the domain name, registration status of the domain name, URI associated with the in-transit packet, data transfer protocol method associated with (e.g., identified by) the in-transit packet, protocol risk associated with the in-transit packet, and/or contextual CTI noise, etc.

Further aspects described herein are directed to determining a disposition and/or a directive (and/or another type of action) in real time (and/or with low latency) for an in-transit packet, where the in-transit packet matches one or more rules that either include no predetermined disposition or that include a disposition other than an allow disposition and a block disposition, such as a "protect" disposition, and applying that disposition, directive, and/or other type of action to the in-transit packet.

Further aspects described herein are directed to determining and applying a disposition and/or a directive (and/or another type of action) for an in-transit packet based on information that is determined (e.g., computed) and/or available (e.g., in real time and/or with relatively low latency)

after the in-transit packet is received and that has not been determined and/or that was not available prior to receiving the in-transit packet. The information may be different from (and/or determined independently from) information that was received from another source (such as a CTI provider) prior to receiving the in-transit packet.

Further aspects described herein are directed to assigning a particular action such as a particular disposition (such as a protect disposition or another disposition that is not allow or block) and/or particular directive to a rule based on a determination that the rule potentially would match a desirable packet such as a packet expected to be legitimate. The determination that the rule potentially would match a desirable packet is based on CTI noise exclusion and/or autoimmunity information.

Further aspects described herein are directed to performing attack detection (such as to detect port scan attacks) based on a plurality of packet flows (e.g., multi-packet multi-flow attack detection). For efficiency, an efficient data structure, for example an LRU cache data structure, and/or an efficient attack packet rate estimator, may be used to perform the attack detection.

Further aspects described herein are directed to using global threat context information to determine a disposition and/or a directive of an in-transit packet. The global threat context information may be based on information provided by one or more other TIGs (or other types of packet-filtering devices) and that has been collected, integrated, and/or distributed on a subscription basis.

Further aspects described herein are directed to using machine learning to determine a disposition and/or a directive for an in-transit packet. For example, the determining may be implemented efficiently by a machine-learning-configured artificial neural network (ANN) of a packet-filtering device such as a TIG. The ANN may be configured to determine (e.g., compute) the disposition and/or the directive in real time after the in-transit packet is received by the TIG and before the next in-transit packet in the same direction is received by the TIG.

These and other aspects will be described in Detailed Description below with reference to the various drawings.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

Figure 1:
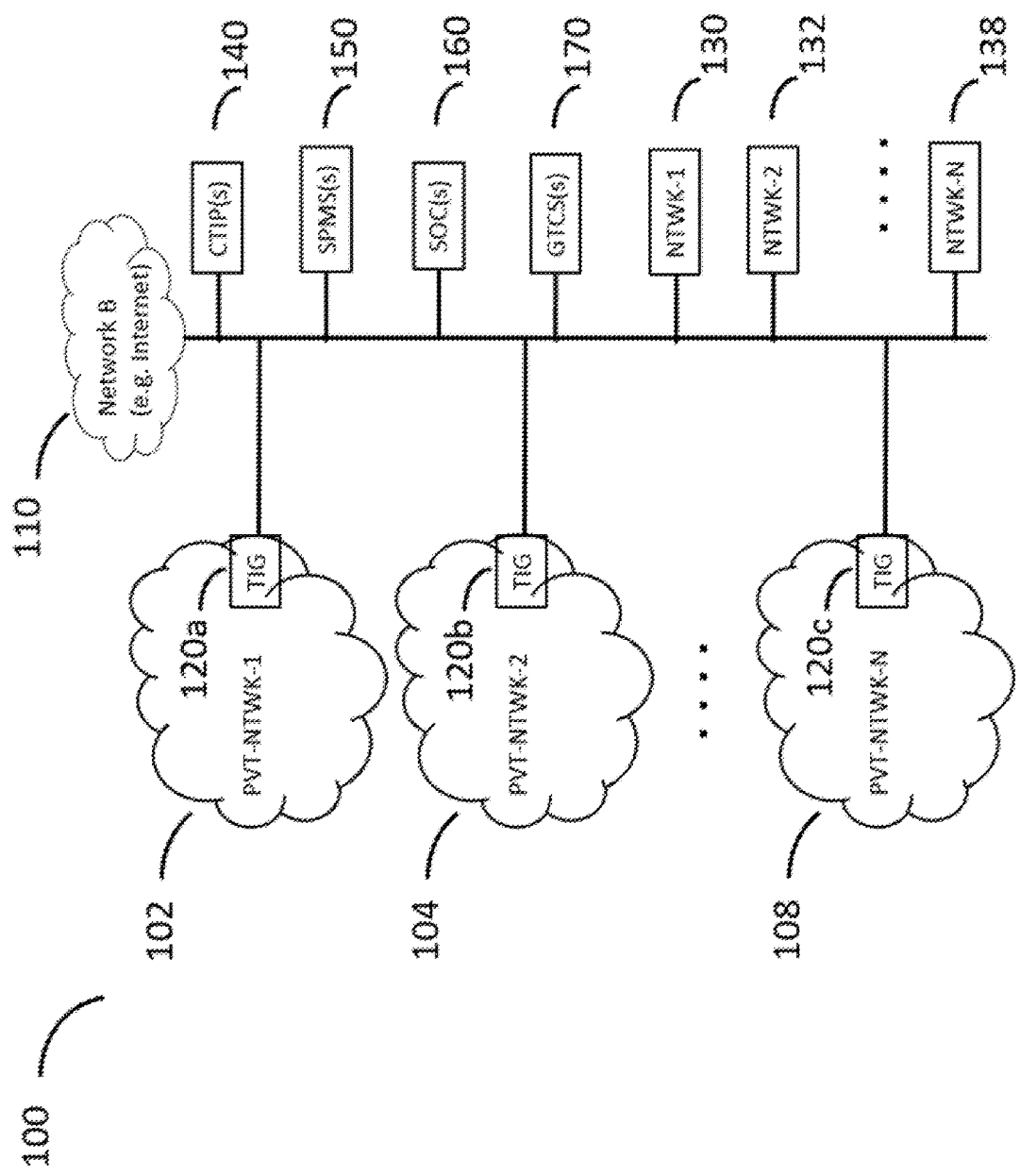
FIG. 1 shows an illustrative environment for efficient threat context aware packet filtering.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logical (e.g., virtual or software-defined), in any combination. In this respect, the specification is not intended to be limiting.

An important component of cyber defense is packet-filtering appliances that apply sets of packet filtering rules to in-transit L3/IP packets crossing a network boundary and determine whether to allow/forward each packet toward its destination or block/drop the packet, i.e., to determine the packet's disposition. In the present context, an in-transit packet may be, for example, an L3/IP packet with a source IP address that corresponds to a host that is upstream from the packet-filtering appliance and with a destination IP address that corresponds to a host that is downstream from the packet-filtering appliance. These network appliances may be inserted inline into links located at the boundary between a private network, such as an enterprise network, and the public Internet and may be configured with a set of packet filtering rules that is designed to protect or otherwise secure the private network in some way. These (inline) network appliances may also be configured such that their network interfaces may not have L3/IP addresses and/or L2/MAC addresses, which may be called a Bump-in-the-Wire (BITW) configuration, and in virtual environments, physical BITW configurations may be emulated by virtual BITW configurations. Accordingly, the set of packet filtering rules defines a (network security) policy, and the network appliance enforces the policy. U.S. Provisional Patent Application Ser. No. 63/071,174, filed Aug. 27, 2020 and entitled "Methods and Systems for Efficient Virtualization of Inline Transparent Computer Networking Devices," is hereby incorporated by reference for its disclosure of how physical BITW configurations may be emulated by virtual BITW configurations.

For example, early-generation network firewalls and edge routers may be configured with packet filtering rules that enforce a private network's access control policies, such as which Internet services that internal hosts are allowed to access, and conversely which internal resources and services may be accessed by which (unsolicited) Internet hosts. The Internet services and internal resources and services may be identified by their IP addresses, Transmission Control Protocol/User Datagram Protocol (TCP/UDP) ports, and/or protocol types; accordingly, the packet filtering rules' matching criteria often correspond to the packets' 5-tuple values, i.e., the (L3) source and/or destination IP address values, and/or (L4) source and/or destination port values, and/or (L3) Protocol value (IPv4) or Next Header value (IPv6). Access control policies and their associated packet filtering rules are often static in the sense that the rate of change for the access-control policies/rules is sufficiently low such that humans may manually manage them. Similarly, the number of rules in a typical policy is sufficiently small such that humans may manually manage them.

For another example, and referring to FIG. 1, which shows a representative network environment 100 for the present disclosure, one or more current-generation packet-filtering appliances, such as threat intelligence gateways (TIGs) 120a, 120b, 120c, may be configured with packet filtering rules. Where any arbitrary one of these TIGs 120a, 120b, 120c are referred to herein, or where they are referred to collectively, they will be referred to herein as simply TIG 120 or TIGs 120. Moreover, the references herein to TIGs is merely an example; all references herein to TIGs will be understood to also be applicable to other types of packet filtering appliances. The packet filtering rules may identify packet matching criteria that correspond to the network addresses and/or identifiers, e.g., IP addresses, 5-tuple values, domain names, URIs, etc., or indicators, of cyber threats that may have been identified by cyber threat intelligence providers (CTIPs) 140 in associated cyber threat intelligence (CTI) reports. CTIPs 140 may continually identify Internet threats, create threat intelligence reports on the threats, determine indicators associated with the threats, and publish (e.g., stream) lists, or feeds, of the threat indicators. Indicators may identify specific Internet hosts and/or specific resources managed by Internet hosts. Subscribers to these feeds may be, for example, security policy management servers/services (SPMSs) 150 that may continually/repetitively: consume multiple different feeds from multiple different CTIPs 140; aggregate the associated indicators (which may number in the millions) by, for example, removing duplicates and resolving address range overlaps; create sets of packet filtering rules (i.e., policies) with packet matching criteria corresponding to the threat indicators, with rule metadata corresponding to the CTIP(s) 140 and feed(s) that supplied the indicators (as well as other associated information about the threat, for example, threat/attack type, confidence, risk score, recommended disposition, and the like), with dispositions of either "block" or "allow", and with directives to, for example, log and/or flow-log matching packets, capture matching packets, etc.; and publish the policies to subscribers. The subscribers may be or may control/administrate packet-filtering appliances (e.g., threat intelligence gateways (TIGs) 120) that may be located at the boundary of and may comprise an interface, or gateway, between private networks (e.g. 102, 104, . . . 108) that are protected by threat intelligence and public networks such as the Internet 110 that may not be protected by threat intelligence, and that may receive the policies and then enforce the policies by applying the policies to network traffic (e.g., in-transit packets) that may pass through the TIGs 120.

Because of the volume and dynamics of CTI supplied by CTIPs 140 (e.g., in aggregate, many millions of threat indicators that are continually updated and published at a high rate, for example, hourly or even continually as a stream), policy creation and associated threat indicator rule construction (by, for example, an SPMS 150) is often an automated process. Accordingly, the selection of a disposition and one or more directives for each threat indicator rule is often performed automatically. Thus, the selection of a "block" disposition or an "allow" disposition may be determined automatically before a rule-matching packet is observed by a TIG 120 and therefore without factoring in any threat context that may be associated with the packet (for example, time, location, operating environment, current (local and global) threat situation, policies of the operator/administrator of the TIG and associated (private) network, etc., of the observation). Furthermore, in practice, because of the uncertainty of threat risk, the "allow" disposition is often selected by default instead of "block" so that legitimate traffic will not be blocked—even when, for example, the CTIP 140 may recommend a "block" disposition with high confidence. Also, different subscribers, for example, different enterprises, may have different policies/requirements regarding selection of "block" vs. "allow" and associated directives, and these policies/requirements may change over time. The possible adverse result of pre-determining dispositions and directives at policy creation time is that the network protections from threats/attacks may be significantly diminished.

The present disclosure describes ways for improving network protections by, for example, computing the best dispositions and directives to be applied to rule-matching in-transit packets for protecting the network at the time that the rule-matching in-transit packets are actually observed/filtered by a TIG 120. At packet observation/filtering time, the TIG 120's logic uses current threat context information to compute the matching rule's disposition and directives that may be applied to the observed in-transit packet. The threat context information may include, for example: local threat context information, for example information that may be stored in the TIG's 120 memory (e.g., main memory) and/or in one or more efficient data structures, that may be readily available to the TIG 120 and/or readily accessible by the TIG 120 and/or efficiently computed by the TIG 120 (e.g., time-of-day/observation time; active attacks that the packet may be associated with; threat context information associated with the matching rules, etc.); and/or global threat context information, for example global threat situation and awareness information on threats/attacks that may be actively or recently occurring on other networks besides the network being protected by the (local) TIG 120, that may be collected and distributed for example by a Global Threat Context System/Service composed of one or more Global Threat Context Servers (GTCS) 170. To reduce the chance of the TIG 120 detrimentally affecting network performance (either at all or by more than an acceptable amount), it may be desirable that the threat context information be available, accessible, computable, and/or otherwise determined for an in-transit packet by the TIG 120 at such a speed (and efficiency) that the threat context information can be determined (and possibly applied) before the next in-transit packet is received by the TIG 120 or before the next in-transit packet is processed by the TIG 120. For example, if packets are received at a rate of X packets per second, then it may be expected that the TIG 120 is able to analyze each incoming packet and determine its associated threat context information in a timeframe of less than or equal to 1/X seconds per packet. It may further be desirable that the TIG 120 is additionally able to determine (e.g. compute) the packet's disposition and/or one or more directives within that same 1/X timeframe. In support of these high processing speeds, and as will be described herein, it may therefore be desirable that any information relied upon by the TIG 120 to formulate the threat context information in real time (for example, by a scheduled deadline corresponding to the 1/X timeframe) for an already-received in-transit packet may be readily and efficiently accessible. For example, the information relied upon to formulate the threat context information may already be local to the TIG 120 and/or in a remote location that is quickly accessible on demand and in real time and with relatively low latency. As will also be described herein, example processing structures that may be particularly suited to such high-speed complex decision-making (to process the threat context information and/or to calculate a disposition and/or one or more directives) may be (bounded) artificial neural networks, data structures with logarithmic-time or constant-time complexity, work-efficient or work-optimal parallel processing algorithms and associated structures, and the like. However, other timeframes (e.g., greater than 1/X) and other processing structures may be used as appropriate or desirable for the situation.

During operation, and referring to the example of FIG. 1, communications via a public network such as the Internet 110 may occur between hosts connected to the private networks 102, 104, . . . 108, which may be protected by TIGs 120 enforcing network protection policies, and hosts connected to the networks 130, 132, . . . 138 that may be associated with threats. Note that hosts connected to the TIG-protected private networks 102, 104, . . . 108 may also be associated with threats (for example, a host may have been compromised by malicious actors), and that any host connected to any network may communicate with any other hosts connected to any other networks. The threat hosts may be associated with threat indicators that may be known to CTIPs 140. Accordingly, the TIGs 120 may be enforcing policies that include packet-filtering rules derived from the threat indicators, for example, packet-filtering rules with matching criteria that correspond to the threat indicators.

When an in-transit packet ingresses a TIG 120 and matches a packet filtering rule, the TIG applies the rule's disposition, for example a block disposition (e.g., block or drop) or an allow disposition (e.g., allow or forward), to the packet, and also applies the logic associated with the rule's directives to the packet, such as "log", "flow-log", "capture", "spoof-tcp-rst", etc. A rule's directives may be correlated to the disposition. For example, a "spoof-tcp-rst" directive, which may generate/spoof a TCP RST packet to terminate the associated TCP connection, may only be used with a "block" disposition (and only if the L4/transport-layer protocol is TCP). If "spoof-tcp-rst" is a directive in a rule with an "allow" disposition, then the associated TCP connection may be terminated, which is likely not desired behavior and may even be interpreted as an attack. For another example, for a rule with a "block" disposition, it may or may not be desirable to have a "capture" directive or even a "log" directive, depending on threat context. For example, consider a TIG observing a typical port scan attack on the protected network, which may generate hundreds of thousands or even millions of TCP SYN packets at rates of hundreds of or thousands of packets per second. If a matching "block" rule includes a "capture" directive, then each TCP SYN packet comprising the port scan attack will be captured, which may use on the order of 100 MB of storage but which has little or no value to cyberanalysts who may be investigating the attack. Similarly, if the matching "block" rule includes a "log" directive, then each TCP SYN packet composing the attack will be logged, which may use even more storage space than the "capture" directive. A cyberanalyst may only need to observe a few of the many packet logs to sufficiently understand the attack in order to determine an effective protective/defensive/remedial action. Conversely, there are other types of attacks, for example, some types of advanced persistent attacks (APTs), which may match a "block" rule but for which each captured and/or logged packet may provide much value to cyberanalysts investigating the attack. In any case, without additional context, it may be problematic and/or inefficient to predetermine rule dispositions and directives before matching packets are observed and therefore without the current threat context (when or after the in-transit packet is received) to guide the selection of dispositions and directives.

Furthermore, for some threats/attacks, the best disposition and directives may change during the lifetime of the threat/attack in response to changes in the threat context. Consider, for example, a typical port scan attack on a network that may be protected by a TIG 120 of the present disclosure, which may include logic for (efficiently) detecting port scan attacks as they are occurring. A typical port scan attack may send many TCP SYN packets at a high rate from the same origin IP address toward many different ports on each (public) IP address of the target network. Suppose the port scan attack detection logic includes a packet arrival rate threshold which, when crossed, may switch the associated threat context between "no active attack" and "active attack". Computing a packet arrival rate involves observing at least two (arriving/received) packets, and for a given port scan attack, more than two packets may be observed before the threshold may be crossed, which may cause the threat context to change. Thus, at or near the beginning of a port scan attack, the best disposition may be "allow" for associated packets that arrive before the threshold is crossed and therefore when the threat context is "no active attack"; but then the best disposition may change to "block" after the threshold is crossed and the threat context changes to "active attack". When the packet arrival rate falls below the threshold, then the threat context may change to "no active attack" and the best disposition may change to "allow".

Accordingly, the present disclosure describes a new disposition, which will be referred to herein as the "protect" disposition, and associated TIG 120 logic associated with the "protect" disposition. At the time that threat indicator rules are created/generated, for example, when a CTI-based policy is being created automatically by an SPMS 150, the "protect" disposition may be specified for a rule as an alternative to "block" or "allow". Upon later observing an in-transit packet that matches a rule with a "protect" disposition, a TIG 120 may use threat context information to determine (for example, compute) the in-transit packet's disposition, for example "block" or "allow", and the associated directives that best protect the network from the associated threat. The determined disposition may then be applied to the in-transit packet. Thus, such an in-transit packet's disposition may be undefined (e.g., unknown) before and until the packet is observed in transit. Moreover, such an in-transit packet's disposition may remain undefined (e.g., unknown) during a time period from when the TIG 120 has determined that the observed in-transit packet satisfies a rule having the "protect" disposition and until the in-transit packet's disposition is subsequently determined based on the threat context information. The name "protect" for this disposition is merely an example; this disposition may be assigned any name as desired. Other non-limiting examples of names that may be used for this disposition include "defend," "guard," "undefined," "undetermined," "null," "flexible," "TBD," "other," "3," "ABC," etc. Regardless of the name, this disposition may be indicative of a state in which threat context information is to be used, in response to an observed in-transit packet, to determine (e.g., compute) the actual disposition to be applied to the in-transit packet. By way of example only, such a disposition, regardless of the actual assigned name, will be referred to herein as a "protect" disposition.

For example, the TIG 120 logic may determine that, even though the observed in-transit packet matched a threat indicator rule (e.g., with a "protect" disposition), the computed disposition to be applied to that in-transit packet is "allow" because, for example, the in-transit packet is determined to be associated with legitimate business communications, or benign communications, or low-risk communications (and then possibly monitored, e.g., logged and captured, for subsequent cyber analysis); or, even with the threat context information, there is still much uncertainty about the threat, and thus the in-transit packet and associated communications may be allowed but monitored and tracked to support subsequent cyber analysis. Note that in practice, the total time needed to (a) access or compute any threat context information, (b) compute/select the disposition and directives to apply, and (c) apply the computed/selected disposition and directives to the current in-transit packet should be sufficiently short relative to packet transmission rates such that in-transit packets are not dropped by the packet filtering appliance (because of, for example, in-transit/arrival packet buffer overflows), which may cause violations of the "transparency rule" of RFC 2979. Conventional packet transmission rates may be measured in millions or tens of millions of packets per second on a single link. This means that threat context information computations should be highly efficient and may have, for example, constant-time (i.e., O(1)) or logarithmic-time (i.e., O(log N)) complexities. Note also that persons skilled in the art may expect that: (1) packet filtering rules follow the general schema and associated syntax and semantics described above, which may be similar to, for example, the schema of iptables or BSD PF; (2) the rules in a policy are searched in the spatial order that they appear in the policy file, i.e., from the top/head of the file to the bottom/tail of the file; (3) a TIG's 120 application of packet filtering rules is stateless (for example, memoryless) in the sense that: (a) each in-transit packet is filtered through the policy in arrival order and has a disposition determined and applied to it before the next in-transit packet in arrival order is filtered through the policy (and has a disposition determined and applied to it); and (b) the disposition, e.g., block or allow, applied to a packet is not dependent on, or correlated with, the disposition applied to any preceding in-transit packet or on the disposition applied to any succeeding in-transit packet; and (4) the packet-filtering appliance/TIG 120 is "transparent" with respect to packet transmission in that (a) packets egress the appliance in the same order that they ingressed the appliance; and (b) latency added by the appliance is negligible, for example, the additional latency is a (small) fraction of (for example, one or more orders of magnitude smaller than) the end-to-end packet transmission time between the host endpoints, associated applications are not affected by the latency, and packets are not dropped because of internal buffer overflows (for example, the appliance behaves like a wire, or a "bump-in-the-wire" (BITW), with respect to packet transmission). Persons skilled in the art may refer to filtering a packet, without regard to how another packet is filtered, as "stateless" packet filtering. RFC 2979 "Behavior of and Requirements for Internet Firewalls", RFC 2544 "Benchmarking Methodology for Network Interconnect Devices", and the like, may formalize some of these potential properties of packet-filtering appliances that persons skilled in the art may expect/assume.

For an in-transit packet that matches a threat indicator rule, examples of threat context information that (a) may be factored into the TIG's 120 decision logic for selecting a disposition and directives that best protect the network (hereafter, "decision logic"), and (b) may be efficiently accessed and/or otherwise determined (e.g., computed) by the TIG 120 in response to an in-transit packet being observed (or otherwise after the in-transit packet is observed), may include but are not limited to one or more of the following, alone or in any combination or subcombination:

Packet Observation Time: The time that the in-transit packet is observed (for example, when the in-transit packet is received, or when the in-transit packet is determined to match a rule, or when the in-transit packet is read) by the packet filtering appliance (e.g., TIG 120). For example, the packet observation time may be the local time of day (and/or day of week, date, month, season, etc.) that the in-transit packet is observed by the TIG 120. Moreover, the packet filtering appliance such as the TIG 120 may determine whether or not the observation time of the in-transit packet by the TIG 120 occurs within a predetermined time period (which may have been predetermined prior to observing the in-transit packet), such as during normal business hours, weekends, holidays, and/or any other desired time period, associated with the TIG 120 and/or with the owner/operator/administrator of the TIG 120, e.g., an enterprise. For example, the TIG 120 may determine the observation time of an in-transit packet matching a rule, determine whether the in-transit packet observation time is within a predetermined time period, determine (e.g., compute) the in-transit packet's disposition and/or one or more directives based on the rule and/or based on whether the in-transit packet observation time is determined to be within a predetermined time period (e.g., disposition 1 (e.g., allow or block) if within the predetermined time period, and a different disposition 2 (e.g., block or allow) if not within the predetermined time period), and then that determined disposition and/or directive(s) may be applied by the TIG 120 to the in-transit packet, wherein the disposition and/or one or more directives may be determined and/or applied prior to the next in-transit packet being observed. As another example, the TIG 120 may determine the in-transit packet observation time, determine (e.g., compute) the in-transit packet's disposition and/or one or more directives based on the rule and/or based on the in-transit packet observation time (e.g., disposition 1 (e.g., allow or block) or a different disposition 2 (e.g., block or allow)), and then that determined disposition and/or directive(s) may be applied by the TIG 120 to the in-transit packet, wherein the disposition and/or one or more directives may be determined and/or applied prior to the next in-transit packet being observed;

Appliance Location and/or Appliance Identifier/ID: The location of the packet filtering appliance (e.g., TIG 120) that observed the in-transit packet. Location may be, for example: geopolitical location (e.g., which country, state, region, etc.); time zone; network location (e.g., at a network boundary or peering point, inside or outside an enterprise security stack/network firewall, etc.). Appliance ID may be used on its own (without applicant location) or to disambiguate between multiple appliances operating at the same or similar appliance location. For example, in response to observing an in-transit packet that matched a rule, a packet filtering appliance such as the TIG 120 may determine the location and/or identifier of itself and determine (e.g., compute) the disposition and/or one or more directives to be applied to that in-transit packet based on the rule, the location, and/or the identifier, and then apply that disposition and/or directive(s) to that in-transit packet, wherein the disposition and/or one or more directives may be determined and/or applied prior to the next in-transit packet being observed. For example, if the location and/or identifier is a first location and/or first identifier, then the disposition and/or directive(s) for that in-transit packet may comprise a first disposition (e.g., block or allow) and/or a first directive, and if the location and/or identifier is a different second location and/or different second identifier, then the disposition and/or directive(s) for that in-transit packet may comprise a different second disposition (e.g., allow or block) and/or a different second directive;

Administrator and/or associated security policy preferences: The enterprise or organization that owns, operates, administrates, or otherwise controls the packet filtering appliance (e.g., TIG 120) that observed the in-transit packet and/or its associated network. For example, different enterprises may have different corporate security policies regarding threat indicators. For example, one enterprise X may consider a given threat indicator to be a significant threat, whereas another enterprise Y may consider the same threat indicator to be low-risk or benign. For example, enterprise X may be subject to US ITAR compliances/restrictions whereas enterprise Y may not; or, enterprise X may allow communications with anonymizing networks like Tor whereas enterprise Y may not. For example, combinations of (public) IP addresses and ports (and associated services) that the enterprise intends to be open/available to unsolicited Internet communications. Furthermore, an enterprise may, over time, change its security policy regarding a given threat indicator. For example, a packet filtering appliance such as the TIG 120 may, in response to observing an in-transit packet that matches a rule, determine an administrator of the TIG 120 and/or a security policy preference (e.g., of the administrator). The TIG 120 may determine (e.g., compute) a disposition and/or one or more directives to be applied to that in-transit packet based on the rule, based on the administrator of the TIG 120, and/or based on the security policy preference, and then apply that disposition and/or directive(s) to that in-transit packet, wherein the disposition and/or one or more directives may be determined and/or applied prior to the next in-transit packet being observed;

Network Type: The type of network associated with the packet filtering appliance (e.g., TIG 120) observing the in-transit packet (e.g., a private network, public network (Internet), LAN, WAN, etc.). For example, a packet filtering appliance such as the TIG 120 may, in response to observing an in-transit packet that matches a rule, determine a type of network associated with (e.g., protected by) the TIG 120. The TIG 120 may determine (e.g., compute) a disposition and/or one or more directives to be applied to that in-transit packet based on the rule and/or the type of network, and then apply that disposition and/or directive(s) to that in-transit packet, wherein the disposition and/or one or more directives may be determined and/or applied prior to the next in-transit packet being observed;

Active Threat/Attack Type: The type of active threat/attack that the observed in-transit packet may be associated with (e.g., port scan, portsweep, exfiltration, distributed denial of service (DDoS), spam, phishing, malware, etc.). See FIG. 3 and associated description below for an exemplary process for protecting networks by using this type of threat context information and the methods of the present disclosure. For example, a packet filtering appliance such as the TIG 120 may, in response to observing an in-transit packet that matches a rule, determine an active threat/attack type that the observed in-transit packet is associated with. The TIG 120 may determine (e.g., compute) a disposition and/or one or more directives to be applied to that in-transit packet based on the rule and/or the active threat/attack type, wherein the disposition and/or one or more directives may be determined and/or applied prior to the next in-transit packet being observed;

Whether a Packet is a Member of an Active Multi-Packet, Multi-Flow Attack: Determining whether the packet is a member of an active multi-packet, multi-flow attack, by performing attack detection (such as to detect port scan attacks) based on a plurality of packet flows (e.g., multi-packet multi-flow attack detection). For efficiency, an efficient data structure, for example an LRU cache data structure and/or an efficient attack packet rate estimator, may be used to perform the attack detection. See, for example, the flow chart of FIG. 3. For example, a packet filtering appliance such as the TIG 120 may, in response to observing an in-transit packet that matches a rule, determine whether the in-transit packet is a member of an active attack such as an active multi-packet multi-flow attack. The TIG 120 may determine (e.g., compute) a disposition and/or one or more directives to be applied to that in-transit packet based on the rule and/or based on whether the in-transit packet is a member of such an active attack, and then apply that disposition and/or directive(s) to that in-transit packet, wherein the disposition and/or one or more directives may be determined and/or applied prior to the next in-transit packet being observed;

Multi-packet, Multi-flow Threat/Attack Analysis Results: Some systems analyze one or more (bi-directional) flows to determine threats and/or attacks associated with the one or more flows composed of one or more observed in-transit packets. Examples of such systems (which will be referred to herein generally as "threat analysis systems") include Intrusion Detection/Prevention Systems (ID SAPS), Network Behavior Analysis (NBA) systems, and the like. The analysis results, or output, of such threat analysis systems may be threat context information that may be used by the packet filtering appliance to compute the disposition and directives for an in-transit packet. The analysis results may be accessed efficiently by, for example, the packet filtering appliance maintaining a flow-tracking table indexed by hashes of the 5-tuple values that (uniquely) characterize each observed flow. Any threat analysis results/outputs associated with a flow may be posted in a flow tracking table. To check if an in-transit packet has any threat context based on these analysis results, the hash of the in-transit packet's 5-tuple values may index into the flow tracking table to access threat analysis results, if any, for the flow associated with the in-transit packet. Hashing and indexing may be done efficiently, for example with constant-time O(1) complexity using well-known algorithms. For example, a packet filtering appliance (e.g., the TIG 120) may observe an in-transit packet that matches a rule, and determine whether that observed in-transit packet is part of a flow associated with analysis results posted by, e.g., an IDS (for example, by comparing a hash of the in-transit packet's 5-tuple value with the indices of a flow tracking table to determine the in-transit packet's flow, and determining whether that determined flow is associated with any analysis results). Based on the rule and/or based on whether the in-transit packet's flow is associated with an analysis result, the TIG 120 may determine (e.g., compute) a disposition and/or one or more directives to be applied to the in-transit packet, wherein the disposition and/or one or more directives may be determined and/or applied prior to the next in-transit packet being observed. For example, if it is determined that the in-transit packet's flow is associated with an analysis result, then a first disposition and/or a first one or more directives are determined and applied, and if it is determined that the in-transit packet's flow is not associated with an analysis result, then a different second disposition and/or a different second one or more directives are determined and applied. As another example, if it is determined that the in-transit packet's flow is associated with a first analysis result, then a first disposition and/or a first one or more directives are determined and applied, and if it is determined that the in-transit packet's flow is associated with a different second analysis result, then a different second disposition and/or a different second one or more directives are determined and applied;

Flow Origination and/or Direction: Whether the flow associated with the observed packet originated from a public network (e.g., the Internet) or from within the private/protected network, and/or the packet's direction. For example, a packet filtering appliance such as the TIG 120 may, in response to observing an in-transit packet that matches a rule, determine whether the flow associated with the in-transit packet originated from a public network (e.g., the Internet) or from within the private/protected network, and/or the packet's direction. The TIG 120 may determine (e.g., compute) a disposition and/or one or more directives to be applied to that in-transit packet based on the rule and/or based on whether the flow associated with the in-transit packet originated from a public network (e.g., the Internet) or from within the private/protected network, and/or based on the in-transit packet's direction, and then apply that disposition and/or directive(s) to that in-transit packet, wherein the disposition and/or one or more directives may be determined and/or applied prior to the next in-transit packet being observed;

Flow State and/or Connection State: For example, whether or not the flow associated with the observed in-transit packet successfully established a TCP connection, the current number of transmitted bytes for the flow, etc. For example, a packet filtering appliance such as the TIG 120 may, in response to observing an in-transit packet that matches a rule, determine a flow state and/or a connection state associated with the observed in-transit packet. The TIG 120 may determine (e.g., compute) a disposition and/or one or more directives to be applied to that in-transit packet based on the rule, the flow state, and/or the connection state, wherein the disposition and/or one or more directives may be determined and/or applied prior to the next in-transit packet being observed;

Global Threat Context: For example, global threat situation and awareness information on threats/attacks that may be actively or recently occurring on other networks besides the network being protected by the (local) TIG 120. Context information associated with threats/attacks that are concurrently attacking networks distributed broadly and globally across the Internet, for example, a portsweep attack. See the description associated with FIG. 5 for an example of how global threat context may be used by the TIG 120 to efficiently determine (e.g., compute) a disposition and/or one or more directives for an observed in-transit packet. For example, the packet filtering appliance (e.g., the TIG 120) may observe an in-transit packet that matches a rule, determine whether the in-transit packet is associated with an attack that may be occurring elsewhere (e.g., on one or more networks other than the local network protected by the TIG 120), and determine (e.g., compute) a disposition and/or one or more directives based on the rule and/or based on whether the in-transit packet is associated with such an attack, wherein the disposition and/or one or more directives may be determined and/or applied prior to the next in-transit packet being observed;

Domain name and/or URI (e.g., URL or URN) threat characteristics: Any domain name and/or URIs contained in the observed packet may display lexical and/or syntactic characteristics that may indicate threat risk. For example: a large percentage of URL-encoded characters in a URI is often correlated with attacks; and domain names that are randomly generated alphanumeric strings or otherwise not well correlated with human language words, for example, English language words; etc. The latter (i.e., correlation with human language words) may be efficiently computed using, for example, information entropy measures. For example, a packet filtering appliance such as the TIG 120 may, in response to observing an in-transit packet that matches a rule with matching criteria that is not a URI, determine a URI (e.g., a URL or a URN) contained in the observed in-transit packet, and may determine whether the URI is associated with a threat. The TIG 120 may determine (e.g., compute) a disposition and/or one or more directives to be applied to that in-transit packet based on the rule and/or the URI (e.g., based on whether the URI is determined to be associated with a threat), wherein the disposition and/or one or more directives may be determined and/or applied prior to the next in-transit packet being observed;

Domain name popularity: The popularity (e.g., current popularity) of a domain name (as measured by, for example, a rate (e.g., an average rate) of DNS requests for resolving the domain) that may be observed in the in-transit packet. Generally/heuristically, the less popular a domain name, the more threat risk may be associated with it. Databases of domain name popularity data and associated services are readily and publicly available. The domain popularity data may be stored locally in efficient data structures and may be quickly/efficiently accessed by TIG logic for use as threat context information. For example, a packet filtering appliance such as the TIG 120 may, in response to observing an in-transit packet that matches a rule, determine a domain name contained in the in-transit packet, and may determine a popularity of the domain name. The TIG 120 may determine (e.g., compute) a disposition and/or one or more directives to be applied to that in-transit packet based on the rule and/or the domain name (e.g., based on the popularity of the domain name), wherein the disposition and/or one or more directives may be determined and/or applied prior to the next in-transit packet being observed;

Domain name registration status: Domain names that are contained in the observed in-transit packet but are not registered in DNS may be attack vectors. DNS-registered domain names data may be stored locally in efficient data structures and quickly/efficiently accessed by TIG logic for use as threat context information. For example, a packet filtering appliance such as the TIG 120 may, in response to observing an in-transit packet that matches a rule, determine a domain name contained in the in-transit packet, and may determine a registration status of the domain name. The TIG 120 may determine (e.g., compute) a disposition and/or one or more directives to be applied to that in-transit packet based on the rule and/or the domain name (e.g., based on the registration status of the domain name), wherein the disposition and/or one or more directives may be determined and/or applied prior to the next in-transit packet being observed. U.S. Patent Application Publication No. 2020/0351245-A1, filed as U.S. patent application Ser. No. 16/399,700 on Apr. 30, 2019, and U.S. Patent Application Publication No. 2020/0351244-A1 filed as U.S. patent application Ser. No. 16/692,365 on Nov. 22, 2019, are both hereby incorporated by reference for their teachings of examples of how to efficiently determine whether a domain name is registered in DNS Data transfer protocol methods: An observed packet matching a threat indicator and containing certain data transfer protocol methods, for example the PUT, POST, or CONNECT method requests of Hypertext Transfer Protocol (HTTP), may be indicative of a malicious data transfer and thus may be threat context information used as input to the TIG logic. For example, a packet filtering appliance such as the TIG 120 may, in response to observing an in-transit packet that matches a rule, determine a data transfer protocol method associated with (e.g., identified by) the in-transit packet. The TIG 120 may determine (e.g., compute) a disposition and/or one or more directives to be applied to that in-transit packet based on the rule and/or the data transfer protocol method, wherein the disposition and/or one or more directives may be determined and/or applied prior to the next in-transit packet being observed;

Protocol Risk: Some (application-layer) protocols associated with the observed packet may be insecure or readily abused by malicious actors. For example, Telnet, SSLv2 and SSLv3, and older versions of TLS are known to be insecure. For example, a packet filtering appliance such as the TIG 120 may, in response to observing an in-transit packet that matches a rule, determine a protocol (such as an application-layer protocol) associated with (e.g., identified by) the in-transit packet. The TIG 120 may determine (e.g., compute) a disposition and/or one or more directives to be applied to that in-transit packet based on the rule and/or the protocol, wherein the disposition and/or one or more directives may be determined and/or applied prior to the next in-transit packet being observed; and/or Contextual CTI Noise: In some cases, threat indicators in CTI that may be generally/globally considered to be associated with actual threats instead may be considered to be associated with legitimate, (very) low risk, and/or benign communications by some locations/administrative domains. Such indicators are referred to herein as "CTI noise". Depending on local context, such indicators may be excluded from the CTI used to protect networks by some administrative domains. For example, in some scenarios, the public/WAN IP addresses assigned to the boundary/interface between a private network X and the Internet may be included in globally distributed CTI as threat indicators. These threat indicators may correspond to actual threats for many/most subscribers but may correspond to legitimate traffic for the private network X. Therefore, the administrators of private network X may want to exclude these indicators from the CTI used to protect private network X. Such actions are referred to herein as performing CTI noise exclusion. Thus, these indicators are threat context information for private network X that may be factored into the logic of any TIG(s) protecting private network X to effect CTI noise exclusion. For example, a packet filtering appliance such as the TIG 120 may, in response to observing an in-transit packet that matches a rule, determine whether a threat indicator associated with the in-transit packet is to be excluded (e.g., is determined to be included in a CTI noise data set). The TIG 120 may determine (e.g., compute) a disposition and/or one or more directives to be applied to that in-transit packet based on the rule and/or based on whether the threat indicator is to be excluded, wherein the disposition and/or one or more directives may be determined and/or applied prior to the next in-transit packet being observed. For example, if the threat indicator is determined to be excluded, the disposition may be determined to be "allow," and if the threat indicator is determined not to be excluded (e.g., not included in the CTI noise data set), the disposition may be determined to be "block." See FIG. 4 and associated descriptions below for an explanation of how this threat context information may be used to compute dispositions and directives that best protect networks from threats/attacks.

Additional information may be used to help compute the disposition and/or directive(s) of an in-transit packet. Examples of such additional information include, and are not limited to:

CTI Provider(s) and/or associated information: The CTI provider or providers that supplied the threat indicator for the matching threat indicator rule, as well as any associated information such as the CTI feed name/identifier and associated information, threat/attack type(s)/categories associated with the threat indicator, recommended disposition, measures of quality, confidence, risk potential/probability, threat/risk type and/or category, quantity and/or identities of the CTI provider(s) that provided the threat indicator, etc., of the CTI provided by the Provider, and the like. Such information may be included in the <metadata> of a threat indicator rule and may be used as input to the TIG 120 logic when a rule-matching in-transit packet is observed. Note that when this information may be included in rule <metadata> at rule creation time, it may be available before a matching in-transit packet is observed/filtered; therefore, it may not be strictly considered threat context information by itself. It may, however, be combined with threat context information by the logic that determines an observed in-transit packet's disposition and/or directives to provide, for example, context for the threat context information;

Threat Indicator Type and/or Fidelity: The fidelity of a threat indicator is correlated to the type of the threat indicator, which may be one of, for example (and listed in order of decreasing fidelity), URL/URI, fully qualified domain name (FQDN), domain name, 5-tuple, IP address, subnet address range, etc. Threat indicators may also include certificates and certificate authorities that may be used to secure communications, for example, TLS-secured communications. Indicators with an indicator type value of "URL/URI" may have the highest fidelity, because a URL maps to a single networked (malicious) resource (e.g., a malware executable file), i.e., there is no uncertainty regarding the threat risk/maliciousness of an indicator of type URL/URI. Whereas threat indicators with an indicator type value of "FQDN" have lower fidelity than "URL/URI" because a single FQDN can map to multiple URLs, or multiple networked resources, some portion of which may be non-malicious. Thus, there may be some uncertainty regarding the threat risk/maliciousness of an indicator of type FQDN. Similarly, threat indicators with an indicator type value of "IP address" have lower fidelity than "FQDN" because a single IP address can map to multiple domains/FQDNs, some portion of which may be non-malicious. For example, domain hosting services often have many domains associated with a single IP address, and it may be the case that only a few/small percentage of the domains are associated with threat activity. As with CTI Provider information described above, threat indicator type and fidelity information may be included in rule <metadata> at rule creation time; therefore, it may not be strictly considered threat context information by itself. It may, however, be combined with threat context information by the logic that determines an in-transit packet's disposition and directives; and/or Threat Indicator Age: In general, recently identified threat indicators may be considered to have higher threat risk than older threat indicators. Indicator age may be included in the rule <metadata> or associated with local efficient data structures containing, for example, recently registered domain names that may be accessed by the TIG logic when an observed in-transit packet contains a domain name. As with CTI Provider information described above, threat indicator age information may be included in rule <metadata> at rule creation time; therefore, it may not be strictly considered threat context information by itself. It may, however, be combined with threat context information by the logic that determines an in-transit packet's disposition and directives.

Any of the above threat context information and/or other information, in any combination or subcombination, as well as other types of threat context information that may not be listed above, may be efficiently accessed and/or otherwise determined (e.g., computed) by the TIG 120, and used by the TIG 120 logic to determine a disposition and/or one or more directives for an in-transit packet observed by the TIG 120.

As explained above, to signal a packet filtering appliance (e.g., TIG 120) to use threat context information to compute a disposition and directives for an observed in-transit packet, a new disposition (referred to herein by way of example as a "protect" disposition) may be added to the packet filtering rule syntax/schema. For example, a threat indicator 12.34.56.00/24 (i.e., a subnet address prefix covering the range of Internet Protocol version 4 (IPv4) addresses [12.34.56.00, 12.34.56.255]) may be supplied by a CTI Provider 140 with an intelligence report that associates the subnet address range 12.34.56.00/24 with some malicious activities, including port scanning; however, there also may be legitimate traffic associated with 12.34.56.00/24. Thus, an enterprise may want to block any malicious activity but allow the legitimate activity (e.g., in case it is business activity). But with this single threat indicator and a conventional packet filtering appliance (i.e., without the threat context information processing capabilities of the present disclosure), an enterprise seeking to protect its network has to choose between enforcing a rule "block log 12.34.56.00/24", thereby risking loss of legitimate business communications, or enforcing a rule "allow log 12.34.56.00/24", and thereby risking business damage from cyberattacks.

As explained throughout this disclosure, with a threat context-enabled packet filtering appliance (e.g., TIG 120) of the present disclosure, the enterprise instead may protect its network from an unprotected resource (e.g., from an unprotected network such as public network 110). The threat context-enabled packet filtering appliance may do so using one or more rules such that in response to determining that one or more of those rules applies to an observed in-transit packet, the threat context-enabled packet filtering appliance may determine threat context information associated with the in-transit packet; determine (e.g., compute) such as by using logic associated with the one or more rules, based on the threat context information, a disposition and/or one or more directives; and apply the computed disposition and/or one or more directives to the in-transit packet. Moreover, the determining the disposition and/or directives (and potentially also the applying the disposition and/or directives) may be efficiently completed before the next in-transit packet is received by (e.g., observed by) the threat context-enabled packet filtering appliance. For example, consider a rule "protect 12.34.56.00/24". The TIG 120 logic associated with the rule may be configured, for example, as "If a matching packet for this rule is observed during normal business hours [or some other timeframe], then 'allow, log, and capture'. If a matching packet for this rule is observed outside of normal business hours and the packet may be associated with a current port scanning attack, then 'block and log'. In this example, the in-transit packet observation time, the outcome of a comparison of "normal business hours" with the in-transit packet observation time, and the determination of whether the observed in-transit packet is associated with a current port scanning attack, may each be threat context information that was not available to the TIG 120 prior to the in-transit packet being observed by the TIG 120. Other TIG 120 logic may apply, based on one or more matching rules, any other type(s) of threat context information in any other combinations or subcombinations, as desired.

The directives that are determined and applied by threat context-aware packet filtering appliances may be of any relevant type. For example, threat context-aware logging directives may be used that further improve the efficiency and effectiveness of CTI-based cyber analysis and defense. Conventional logging directives may be used, including, for example, a basic "log" directive, which creates a log for a single packet, and a "flow-log" directive, which aggregates logs of packets from the same flow (i.e., the same bidirectional 5-tuple) into a single log for the flow. In the context of CTI-driven network protection, which may use logs for improving network protections, these basic packet log and flow log directives may, in some scenarios, be both ineffective and inefficient. For example, a typical port scan attack on an enterprise network boundary may comprise many thousands or millions of packets in a relatively short amount of time, generating a log for each packet. Furthermore, because each packet in a port scan attack may have a different 5-tuple flow characteristic, flow logging may not significantly reduce the number of logs and/or the volume of log data. Thus, log directives may be implemented that, for example, collect statistical/aggregate/cumulative data on correlated packets (e.g., packets comprising the same port scan attack) and produce a single log for many packets and/or flows in such a way that the single log for the attack is much more effective for cyber analysis and defense than the many packet logs and/or flow logs that would have been generated otherwise. Similarly, log directives that are designed for specific cyber attacks, such as the example port scan attack described above, may be implemented that produce a single log for an attack incident that has high information value for cyber analysis and defense. Examples of such log directives are described in U.S. Provisional Patent Application Ser. No. 63/106,166, filed Oct. 27, 2020 and entitled "Methods and Systems for Efficient Adaptive Logging of Cyber Threat Incidents," hereby incorporated by reference for its disclosure of the above-mentioned log directives. These log directives may be determined (e.g., computed) based on any or all of the threat context information collected or otherwise determined by the TIG 120 for one or more of the observed in-transit packets.

With so many potential sources and types of threat context information and the many possible combinations, it may become impractical for humans to design accurate and efficient decision logic. In this scenario, and depending upon the data speed, TIG capacity, and/or other factors, machine learning may be desirable or even necessary to design some or all of the decision logic. For example, a machine-learned artificial neural network may be created that has a plurality of input nodes that correspond to sources of threat context information and to information derived from the in-transit packet being filtered, and a plurality of output nodes that correspond to the dispositions and the directives to be applied to the in-transit packet. The neural network may be created in such a way, for example as a bounded-depth classifier, that the decision logic is highly efficient (e.g., has constant-time complexity). In addition to or as an alternative to artificial neural networks, other machine learning algorithms and methodologies may be used to design the decision logic, for example, evolutionary algorithms, genetic algorithms, genetic programming, and the like.

Persons of ordinary skill in the art may appreciate that in some embodiments of the present disclosure, the "protect" disposition may be treated as a procedure call by the TIG application logic and accordingly may be parameterized with variables in order to, for example, specify default values for disposition and directives, and/or specify which threat context information may be used to compute dispositions and directives, and the like. For example, "protect (disposition="allow", directives="log, capture", threat-context::"port-scan-attack, time-of-day") may signal the TIG application logic to compute the disposition and directives by using the threat context information associated with port scan attack detection logic and with the current time-of-day (which may correspond to the observation time of the in-transit packet). Furthermore, the default values for disposition and directives may be used if, for example, the TIG logic for computing the disposition and directives is non-determinate, which may occur, for example, if the TIG may be executing a version of the application logic that may not support the specified threat context logic. Also, the TIG application logic may treat the dispositions "block" and "allow" as procedure calls that may implicitly execute logic that may transparently use some threat context information to cause useful/desirable side effects when the "block" or "allow" operation is applied to the packet. A concrete example of such logic is described below in association with FIG. 4.

As an example of using multiple types and combinations of threat context information that may only be available at the time, location, and environment of in-transit packet observation to compute dispositions and directives for an in-transit packet, consider the following: A major issue associated with protecting networks using cyber threat intelligence (CTI) that may be addressed by using the threat context filtering methods of the present disclosure is handling port scan attacks (as well as some attacks with similar characteristics as port scan attacks, for example, portsweep attacks, some DDoS attacks such as reflected spoofed attacks, etc.). In a typical port scan attack, a malicious actor may use a port scanner application to search the target/victim network for any services that may be "open", i.e., services accessible by Internet hosts at L3 (IP) and accepting connections at L4 (TCP), and thus potentially exploitable or attackable. Persons skilled in the art may refer to such malicious activity as (cyber) reconnaissance. For each public IP address of the target network, for example, the 256 contiguous IP addresses forming a /24 IPv4 subnet address block, there are potentially 48K well-known or registered ports that may be open. For example, an enterprise may host its public-facing web server on port 80 (the well-known port for HTTP service) and/or port 443 (the well-known port for HTTP Secure (HTTPS)) of a public IP address assigned to the enterprise. A port scanner typically sends a TCP SYN handshake flag to a given {IP address, port} pair. If the {IP address, port} responds with TCP SYN-ACK handshake flags, then the port scanner knows the {IP address, port} pair is "open", i.e., accepting (unsolicited) TCP connection requests. This information may then be used to attack or otherwise exploit the service associated with the open port. During a typical attack on a target network, the port scanner may send hundreds or even thousands of TCP SYNs per second to different {IP address, port} pairs over a period of several minutes.

To evade attribution, for example, the malicious actor may compromise an otherwise legitimate host computer or computers connected to an otherwise legitimate enterprise network, for example network 130 of FIG. 1, and install a port scanner program on the host computer(s). To avoid notice and/or mitigate any adverse effects of the attack on the business operations of the target, the malicious actor may also launch a port scan attack during the non-business hours of the enterprise that operates the target network.

A CTI Provider or Providers 140 may determine that a (compromised) host computer, for example host C, connected to network 130, is a source of port scan attacks and/or other malicious activity, and may include the one or more IP addresses associated with host C in the CTI feeds that it publishes to subscribers. For example, host C may be assigned one or more public IP addresses associated with the boundary of network 130 and the Internet 110. For example, the ISP for network 130 may allocate the IPv4 subnet address range 22.22.22.00/24 to network 130, and a network address translation (NAT) device at the boundary may temporally assign any of the 256 IPv4 addresses in 22.22.22.00/24 to host C when host C is performing Internet communications, including when host C is conducting port scan attacks. Thus, a CTI Provider may include one or more IP addresses from 22.22.22.00/24 as threat indicators in one or more CTI feeds, and/or may include the subnet address prefix 22.22.22.00/24 as a single threat indicator in one or more CTI feeds.

During policy construction, and for systems that are not enabled with the methods/technology of the present disclosure, it is often the case that such CTI/threat indicators are transformed into packet filtering rules with "allow" disposition (and with "quick", "log", and/or "flow-log" directives) instead of "block" disposition. This is because enterprises that protect their networks with such CTI and associated packet filtering rules may not want to risk blocking/dropping legitimate business traffic, especially during normal business hours. Thus, the enterprise may detect such port scan attacks (because of the "log" and/or "flow-log" directives and associated log analysis/threat awareness applications), but the malicious actor's mission is achieved (e.g., the open ports may be known by and associated services may be characterized by the malicious actor). Additionally, the associated logs generated by the port scan attack may flood/overwhelm any log analysis/threat awareness applications and associated resources (e.g., compute resources, storage, network bandwidth, and/or cyberanalysts operating the applications).

Figure 2:
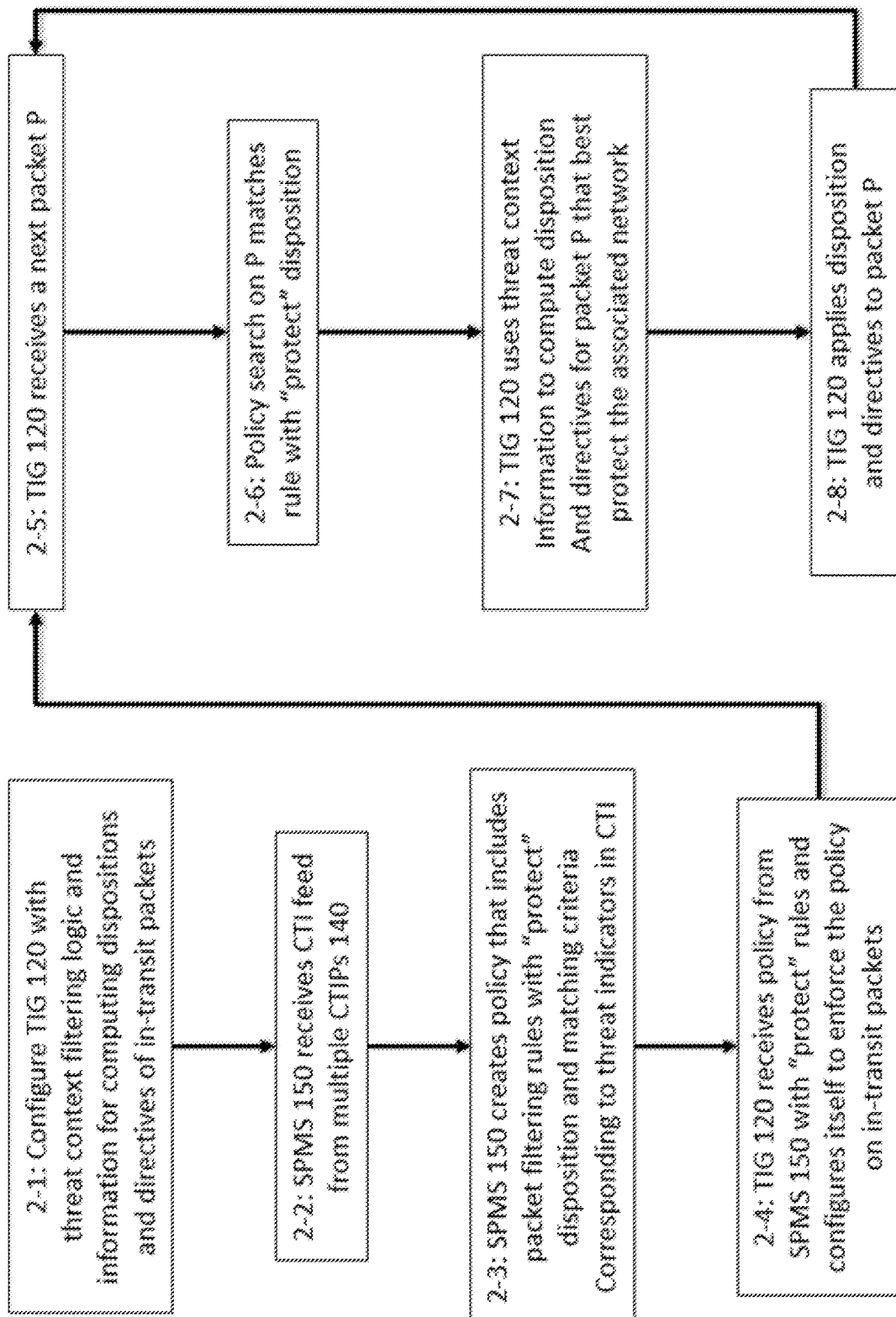
FIG. 2 is a flowchart describing a packet filtering appliance's exemplary use of threat context information associated with active attacks to compute dispositions and/or directives for in-transit packets.

FIG. 2 is a flowchart describing a packet filtering appliance's (such as a TIG 120) exemplary use of threat context information associated with active attacks to compute dispositions and/or directives for in-transit packets. At Step 2-1, the TIG 120 may be configured with threat context filtering logic and/or other information that may be used for computing dispositions and/or directives of in-transit packets. This configuration step may be performed before the TIG 120 goes online in its network and/or as part of an update after the TIG 120 is already online. As will be described below, this configuration may comprise traditional threat context filtering logic as well as other types of logic such as the configuration of an artificial neural network classifier of the TIG 120.

Next, at Step 2-2, SPMS 150 may receive one or more CTI feeds provided by one or more CTIPs 140.

At Step 2-3, SPMS 150 may aggregate the associated threat indicators based on those one or more CTI feeds and create one or more sets of packet filtering rules (which may be associated with one or more policies) with packet matching criteria corresponding to the threat indicators. The rules in the policies may further be associated with various dispositions. For example, at least some of the rules in a given policy may be associated with a "protect" disposition, whereas other rules in the policy may be associated with "allow" or "block" dispositions. In further examples, the rules may be associated with information indicating that a disposition is to be determined at in-transit packet observation time. For example, as discussed previously, a rule may have or otherwise be associated with a value (such as a flag) indicating whether the disposition is to be computed at in-transit packet observation time using threat context information. For example, a rule may have a field containing a flag, where a flag value of zero means "use the rule's predetermined disposition" and a flag value of one means "compute the rule's disposition at in-transit packet observation time." More generally, each rule may be associated with a predetermined disposition that is applied by default at in-transit packet observation time, or associated with an indication (such as the "protect" disposition, or a null disposition, or the above-described flag) that the disposition is to be computed at in-transit packet observation time and/or is not predetermined before the in-transit packet observation time.

At Step 2-4, SPMS 150 may publish the policies to its subscribers, which may include the TIG 120. Thus, the TIG 120 may receive a policy from SPMS 150, which as mentioned above may include the one or more rules associated with the various dispositions. The TIG 120 may, using the received policy, self-configure to be able to enforce the policy on future observed in-transit packets.

Figure 9:
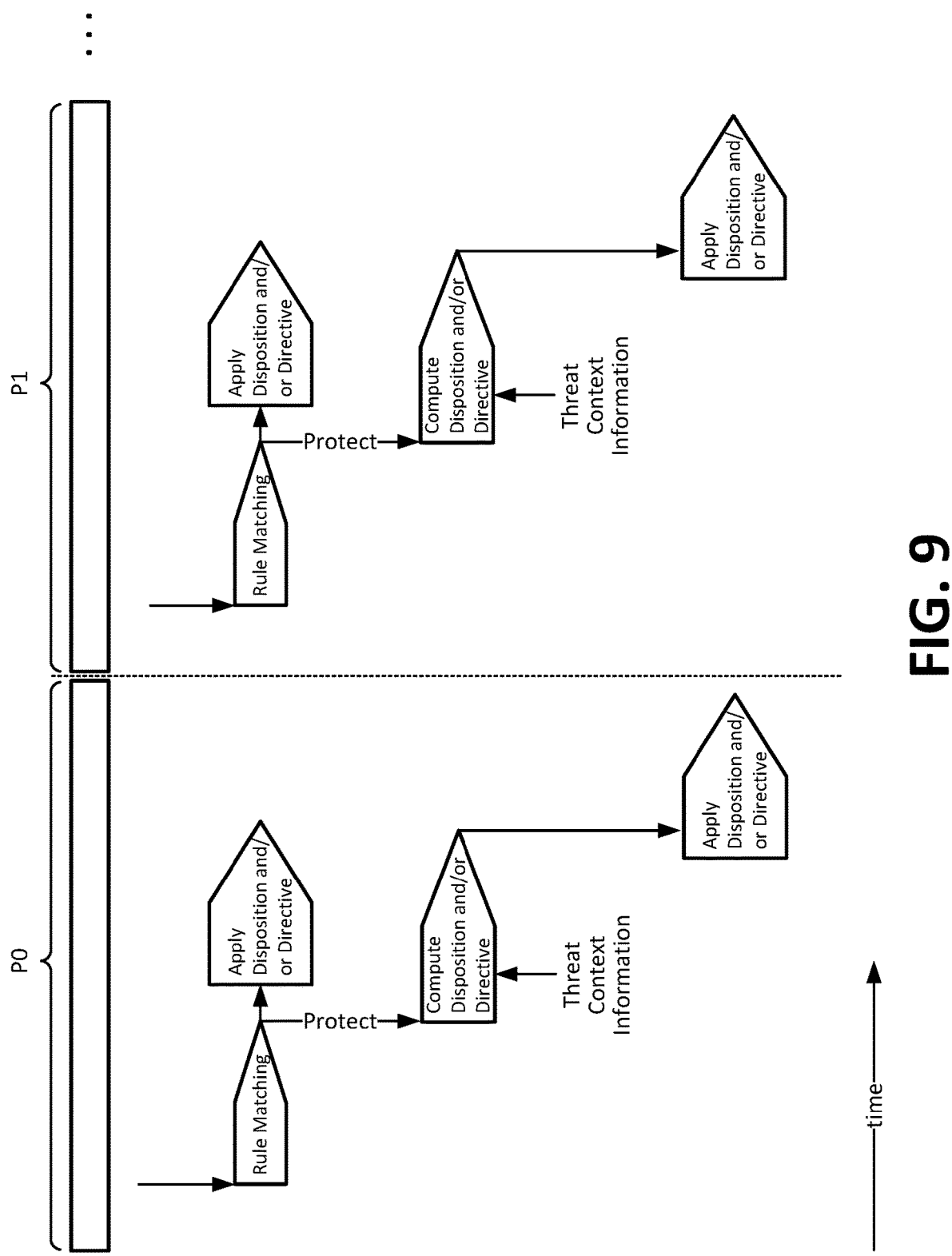
FIG. 9 is an example timing diagram in accordance with aspects described herein.

At Step 2-5, the TIG 120 may receive, for example from another network such as network 110, the next in-transit packet P. For example, FIG. 9 shows a series of in-transit packets P0, P1, etc. being received by the TIG 120. The next-in transit packet P in Step 2-5 may be considered, for example, to be packet P0 of FIG. 9.

At Step 2-6 of FIG. 2, the TIG 120 may perform a search of its policy (that was received and configured in Step 2-4) to see which rule or rules may match (apply to) the in-transit packet P. If the TIG 120 determines that the in-transit packet P matches a rule associated with a "block" or "allow" disposition, and/or is otherwise not indicated as being associated with subsequent disposition computation, then the TIG 120 may apply that predetermined disposition identified by the rule. This is shown by way of example in FIG. 9, in which the rule matching may result in an immediately determined disposition (and/or directive) indicated by a matching rule, and which may be applied to the in-transit packet P0. If, however, the TIG 120 determines that the in-transit packet P matches a rule associated with a "protect" disposition or otherwise is associated with an indication that the disposition (and/or other action to be applied to the in-transit packet) is to be computed at in-transit packet observation time and/or is not predetermined before the in-transit packet observation time, then Steps 2-7 and 2-8 (FIG. 2) may be performed and the process may return to Step 2-5 to receive the next packet.

At Step 2-7, in response to the in-transit packet P and/or in response to the determination that the in-transit packet P matches a rule associated with a "protect" disposition (or is otherwise associated with computation of disposition at in-transit packet observation time), the TIG 120 may determine threat context information associated with in-transit packet P and/or associated with the rule. The determined threat context information may include one or more types of threat context information, such as any of the types of threat context information described herein (e.g., observation time, appliance location, etc.). The TIG 120 may determine (e.g., compute), based at least in part on the threat context information, a disposition (e.g., "allow" or "block") and/or one or more directives (e.g., "log," "quick," etc.). The computed disposition and/or directive(s) may be ones that are determined to best protect the network associated with the TIG 120 (e.g., network 102 associated with TIG 120*a*). This is shown by way of example in FIG. 9, where if the rule matching process determines that the in-transit packet (P0, in this example) matches a "protect" disposition rule or is otherwise associated with computation of disposition at in-transit packet observation time, then a disposition, a directive, and/or some other action to be applied to the in-transit packet may be computed based on threat-context information associated with the in-transit packet P0, and the computed disposition, directive, and/or other action may be applied to the in-transit packet P0.

Figure 10:
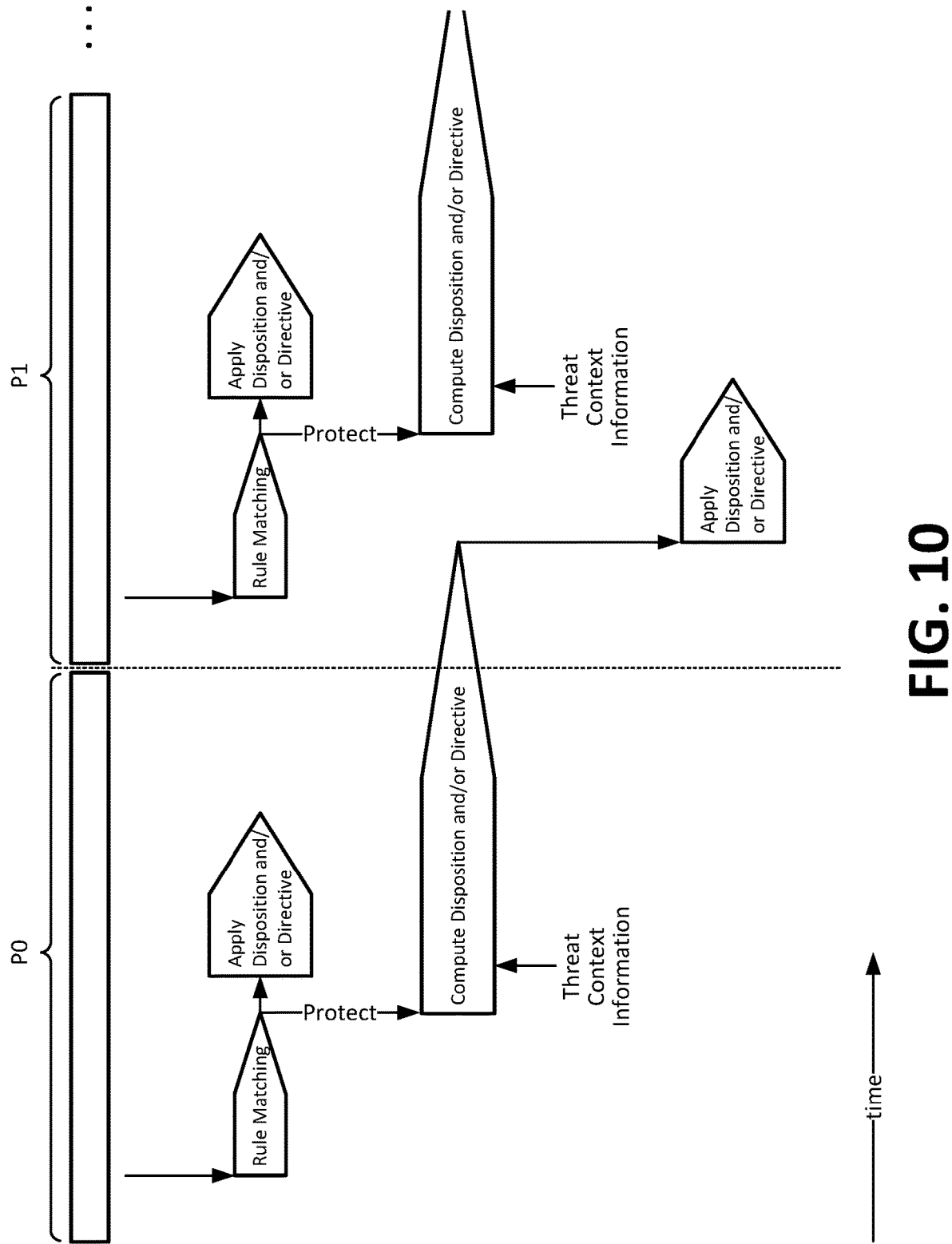
FIG. 10 is another example timing diagram in accordance with aspects described herein.

In the example of FIG. 9, the entire process for a given in-transit packet, from rule matching to computing disposition and/or directive to applying the computed disposition and/or directive, may all be completed by the TIG 120 prior to the next in-transit packet (P1) being received by the TIG 120. However, other timings may be feasible. For example, the process up through computing the disposition and/or directive may be completed prior to the TIG 120 receiving the next in-transit packet P1. As another example, the disposition and/or directive for in-transit packet P0 may be partially or fully computed prior to the disposition and/or directive being computed or otherwise determined for the next in-transit packet P1, even if the disposition and/or directive for in-transit packet P0 may not be applied prior to observing the next in-transit packet P1. An example of this latter timing is shown in FIG. 10. Such timing may work efficiently where, for example, the TIG 120 is able to compute the disposition and/or directive (and/or the application of the disposition and/or directive) for an in-transit packet (e.g., P0) simultaneously with (e.g., in parallel with or concurrently with) performing rule matching for the next in-transit packet (e.g., P1). This timing may be feasible where, for example, different (and/or independent) processing resources are used for rule matching as compared with the processing resources used for computation of dispositions and/or directives based on threat context information, and/or where computing the disposition and/or directive for an in-transit packet P0 does not interfere with rule matching for the next in-transit packet P1 (and vice-versa).

At Step 2-8 of FIG. 2, the TIG 120 may apply the computed disposition and/or the computed one or more directives to the in-transit packet P. Then, the process may return to Step 2-5 to receive the next packet (e.g., packet P1 of FIG. 9 or FIG. 10). In some examples, the process of FIG. 2 may be performed one step at a time, in a pipeline processing manner. In further examples, the process of FIG. 2 may be performed where performance of one or more of the steps may overlap in time and/or may be simultaneous.

The methods and technologies of the present disclosure that factor in threat context information when computing dispositions and/or directives at in-transit packet observation time may be used to protect networks in the above scenarios and/or in other (e.g., similar) scenarios. For example, for the above scenarios that include port scan attacks, the relevant threat context information associated with an in-transit packet at observation time may comprise (a) whether or not the packet is part of/comprises an active port scan attack; (b) whether or not the observation time is during normal business hours; and (c) possibly other threat context information, such as which combinations of IP addresses and ports (and associated services) that the enterprise intends to be open/available to unsolicited Internet communications. For example, suppose an (in-transit) packet P0 matches a rule R0 with a "protect" disposition, and the associated TIG's 120 logic for computing the disposition and directives factors in the threat context information (a) and (b) listed above. An example of such TIG 120 logic, written in pseudocode as a procedure, may be as follows:

```
Compute-Disposition-and-Directives(in packet:P0, out string:Disposition-and-
   Directives):
      IF   (Member-Active-Port-Scan-Attack(P0)   AND   NOT(Normal-
         Business-Hours(current-time( ))))
      THEN Disposition-and-Directives := "block, log, quick";
      ELSE Disposition-and-Directives := "allow, log, quick";
      End Compute-Disposition-and-Directives;
```

Referring to the above pseudocode, the procedure Compute-Disposition-and-Directives( ) accepts as input the (in-transit) packet named P0 that has matched a "protect" rule associated with CTI and outputs a string Disposition-and-Directives containing the computed disposition and directives that may be applied to P0 to best protect the network. The Boolean function Member-Active-Port-Scan-Attack (P0) determines if packet P0 is part of an active port scan attack. The Boolean function Normal-Business-Hours( ) determines if the input time, which is the function call current-time( ) in the exemplary pseudocode above, occurs during normal business hours (which may be locally configurable). Overall, the procedure in this example combines multiple types and values of threat context information that may be available only at (and not before) the in-transit packet's observation or filtering time to compute the disposition and directives that best protect the network from the threat associated with an in-transit packet that has matched a packet filtering rule derived from CTI.

As noted above, when factoring in threat context information into logic for computing dispositions and/or directives for in-transit packets, it may be desirable that the threat context information and associated TIG logic be computed efficiently, for example, that the (time) latency incurred from threat context information determinations (e.g., computations) does not adversely affect the packet processing performance of the packet filtering network appliance (e.g., TIG 120) and thereby cause a violation of the "transparency rule" of RFC 2979. For example, (relatively) high latency may cause in-transit packet buffers of packet filtering network appliances to overflow and thereby may cause packet drops, which may affect the performance of the associated networked applications. Referring to the above example, the threat context information (a) and (b)—i.e., (a) "is the packet a member of an active port scan attack?," which may be implemented as the function Member-Active-Port-Scan-Attack( ) described above, and (b) "is the packet's observation time during normal business hours?," which may be implemented as the function Normal-Business-Hours( ) described above—therefore would be efficiently computed. Persons skilled in the art know how to efficiently compute functions such as (b)/Normal-Business-Hours( ) or other similar time-based functions, for example, by accessing a timestamp( )

function in the TIG 120 that may be available in a software development kit, e.g., the Data Plane Development Kit (DPDK), that is designed to efficiently process in-transit TCP/IP packets. While accessing a time function that may be a system call to the TIG's 120 relatively slow operating system kernel may also produce this information, this may be a less efficient (and thus potentially impractical) way of doing so. Persons skilled in the art, however, may not know how to efficiently compute (a)/Member-Active-Port-Scan-Attack( ) and certain functions similar to (a), e.g., how to efficiently compute if a (in-transit) packet is a member of an active port scan attack and/or a member of an active attack that may be structurally similar to a port scan attack, for example a portsweep attack.

Accordingly, we next describe an example efficient method for computing (a)/Member-Active-Port-Scan-Attack( ) and functions similar to (a). The example method includes, for each attack type of interest:

(1) characterizing the structure (e.g., architecture) of the attack type and the associated information;
(2) identifying the attack information, or key, that may uniquely characterize each instance of the attack type and may be used as or may correspond to an index into and/or unique identifier of a set of (potential) attack instances, which may be considered elements of the set;
(3) creating an (efficient) set data structure for managing (potential) instances of the attack type, where each distinct instance of the attack type, or equivalently each element in the set, is identified by/associated with its (unique) key. The set data structure may be associated with at least the operations Insert(key, element), which inserts a new element identified by key, for example a new (potential) attack instance, into the set, and Member(key), which tests if there is an element already in the set that corresponds to the key. Furthermore, for attack types that are comprised of multiple packets, such as port scan attacks, an additional (Boolean) operation Is-Active-Attack(key) may be associated with the set data structure. For example, for some attacks that may be composed/comprised of multiple packets, a potential attack instance may not be determined to be an active/actual attack until certain multi-packet criteria are met. For example, a potential port scan attack instance may be determined to be active, i.e., an actual vs. potential attack instance, only after multiple different ports have been scanned and the attack packet rate exceeds a threshold value. Both criteria in this example require that multiple packets associated with a (potential) attack instance have been observed; and
(4) configuring and operating the TIG with logic for determining if an in-transit packet is part of, or comprises, an instance of an (active) attack.

For exemplary purposes, the above methodology, which may be applied to port scan attacks, but which may be readily adapted to other types of attacks, may be described as follows.

As for (1), which is characterizing the structure or architecture and associated information of a single, distinct instance of a (typical) port scan attack on a target network being protected by a TIG, a characterization may include:

Inbound (relative to the TIG and network being protected) packets containing a TCP SYN flag;
Such packets being sourced by/originating from the same Internet IP address and/or the same (small) subnet address range, for example the same /24, /28, or /32 IPv4 subnet address prefix;
Such packets being destined for multiple different public IP addresses of the target network and/or being destined for multiple different ports; and/or
Such packets being sent at a rate that exceeds a (heuristic, configurable, and/or predetermined) threshold, such as ten (10) such packets per second, although other threshold values may be used.

Thus, for example, the collection of information that may (efficiently) represent an instance of a (potential) port scan attack may include any one or more of the following in any combination or subcombination:

the source IP address or subnet address prefix, which may also be identified/associated with the key that uniquely characterizes or represents the attack;
the current number of packets comprising the attack;
the number of different ports scanned by the attack, and a (configurable and/or predetermined) threshold value that may determine that the potential attack may be an active port scan attack (for example, in practice the threshold value may be four (4) different ports, although other threshold values may be used);
the number of different destination IP addresses scanned by the attack;
the current rate (e.g., packets per second) of the attack, and a (configurable and/or predetermined) threshold value that may determine that the attack may be an active port scan attack, for example, in practice the threshold value may be ten (10) packets per second, although other threshold values may be used. Estimates of current rates may be computed efficiently by using, for example, logic based on an exponentially weighted moving average (EWMA) method, or based on an exponential smoothing method. Exponential smoothing is time and space efficient because each update to the estimate after each (attack) packet has been received requires only a constant-time O(1) computation (typically two multiplications and one addition), and typically only three values need be stored at any time (for each managed attack, e.g., for each potential attack in each set data structure for managing attacks of a given type);
a start time of the attack, for example, the observation time of a particular (e.g., the first) packet comprising the attack;
a unique identifier for the (potential) port scan attack instance;
and/or the like.

As for (2), which is identifying the attack information, or key, that may uniquely characterize each instance of the attack: For typical port scan attacks, a unique key may be a (inbound TCP SYN) packet's source IP address or an associated (small) subnet address range, such as the /24 or /28 IPv4 subnet address prefix corresponding to the packet's source IP address.

As for (3), which is creating an (efficient) set data structure for managing (potential) instances of port scan attack, an exemplary efficient set data structure may be a Least Recently Used (LRU) cache. An LRU cache may be implemented as a (bounded) doubly linked list with an associated hash map for efficiently indexing into the linked list. The elements of the set are instances of potential port scan attacks, that may be represented by the information described above in (1), and that may be uniquely identified by/associated with the key described above in (2). The set operations/functions for a set data structure such as an LRU cache may include: Insert(key, element), a procedure that may insert a new (potential) port scan attack instance, or element, identified by the key into the set of (potential) port scan attacks; Member(key), a function that determines whether or not a (potential) attack, which is uniquely represented/identified by the key, is an element in the set; and Delete(key), a function that removes the associated element from the set. For an LRU cache, both Insert( ) and Member( ) may have constant-time complexity, i.e., O(1) complexity, and may therefore be examples of efficient operations. For a (bounded) LRU cache, the Delete( ) function may also have O(1) complexity but may be transparent/implicit/not exposed because an element is automatically deleted from an LRU cache if the associated set has reached its size limit and if the element is the oldest, or least recently used (LRU), element in the set. This way, attacks that may have ended, subsided, or otherwise gone dormant may be efficiently removed from the set of potential and/or active attacks. For the exemplary case of port scan attacks, for which a single instance may be composed/comprised of multiple packets and/or for which multiple packets may be necessary to determine whether or not an attack instance is currently active, an additional input parameter named "packet" may be added to both the Member(key, packet) function and the Insert(key, packet, element) procedure associated with the set, with the following example semantics/logic:

Member(key, packet) searches the set for an element, for example an instance of a (potential) port scan attack, that matches the key (for example, the packet's source IP address). If there is no match (e.g., there is no element/port scan attack instance in the set that the packet corresponds to/is associated with), then return FALSE. If there is a match (e.g., there is an element/port scan attack instance in the set that the packet corresponds to/is associated with), then (1) integrate the packet with the matching instance, for example: increment the current number of packets comprising the attack; if necessary or otherwise appropriate, update the number of different ports comprising the attack; if necessary or otherwise appropriate, update the number of different destination IP addresses comprising the attack; update the current rate of the attack; etc., and (2) return TRUE. Note that the packet integration computations may be sufficiently efficient, for example having O(1) complexity, such that the overall efficiency of the computation of the disposition and directives does not decrease;

Insert(key, packet, element) inserts a new (unique) element, for example a new instance of a (potential) port scan attack, which may be identified by the key and may be initialized with the packet. For example, for the new element/new attack instance: the source IP address or subnet address range associated with the new attack instance may be set to the key, which may be, for example, the source IP address of the packet or the corresponding subnet address prefix; the current number of packets comprising the attack may be initialized to, e.g., 1; the number of different ports scanned by the attack may be initialized to, e.g., 1; the number of different destination IP addresses scanned by the attack may be initialized to, e.g., 1; the current rate may be set to, e.g., 0; the start time of the attack may be set to the current time (e.g., wall clock, local, or using some other time standard); a (unique) identifier for the port scan attack, which may be automatically generated by a local or global service; and/or so on.

For managing port scan attacks, the set data structure may also be associated with a Boolean function Is-Active-Attack (key), which returns TRUE if the element/attack instance corresponding to the key is currently active and returns FALSE if the element/attack instance corresponding to the key is currently not active (or if there is no element/attack instance corresponding to the key in the set). Whether a port scan attack is active or not may be determined by, for example, comparing the value of the number of different ports scanned parameter to a (pre-configured) threshold value, e.g., four (4) different ports scanned, and comparing the value of the current rate parameter to a (pre-configured) threshold value, e.g., ten (10) packets per second. If both parameter values exceed (or meet or exceed) their respective thresholds, then the attack may be considered active; otherwise, the attack may be considered not active.

With efficient implementations of Insert( ), Member( ), and Is-Active-Attack( ), an efficient function Member-Active-Port-Scan-Attack( ) referenced in the above pseudocode for Compute-Disposition-and-Directives( ) may be described (in pseudocode), for example, as follows:

Boolean Member-Active-Port-Scan-Attack(in packet: P0):
    Key key:=Port-Scan-Attack-Key(P0); /*e.g., the source IP address of packet P0*/
    IF NOT(Member(key, P0)) THEN Insert(key, P0, new element( ); ENDIF;
    Return Is-Active-Attack(key); /*end of function Member-Active-Port-Scan-Attack*/

For exemplary purposes, the above function assumes that a set data structure for managing potential port scan attacks has been initialized by, for example, TIG application logic, and is transparently available. Also, for different types of attacks besides port scan attacks, for example portsweep attacks, functions similar to the above Member-Active-Port-Scan-Attack( ) may be utilized with the appropriate and corresponding sub-functions, data structures, keys, and elements for the attack type.

Figure 3:
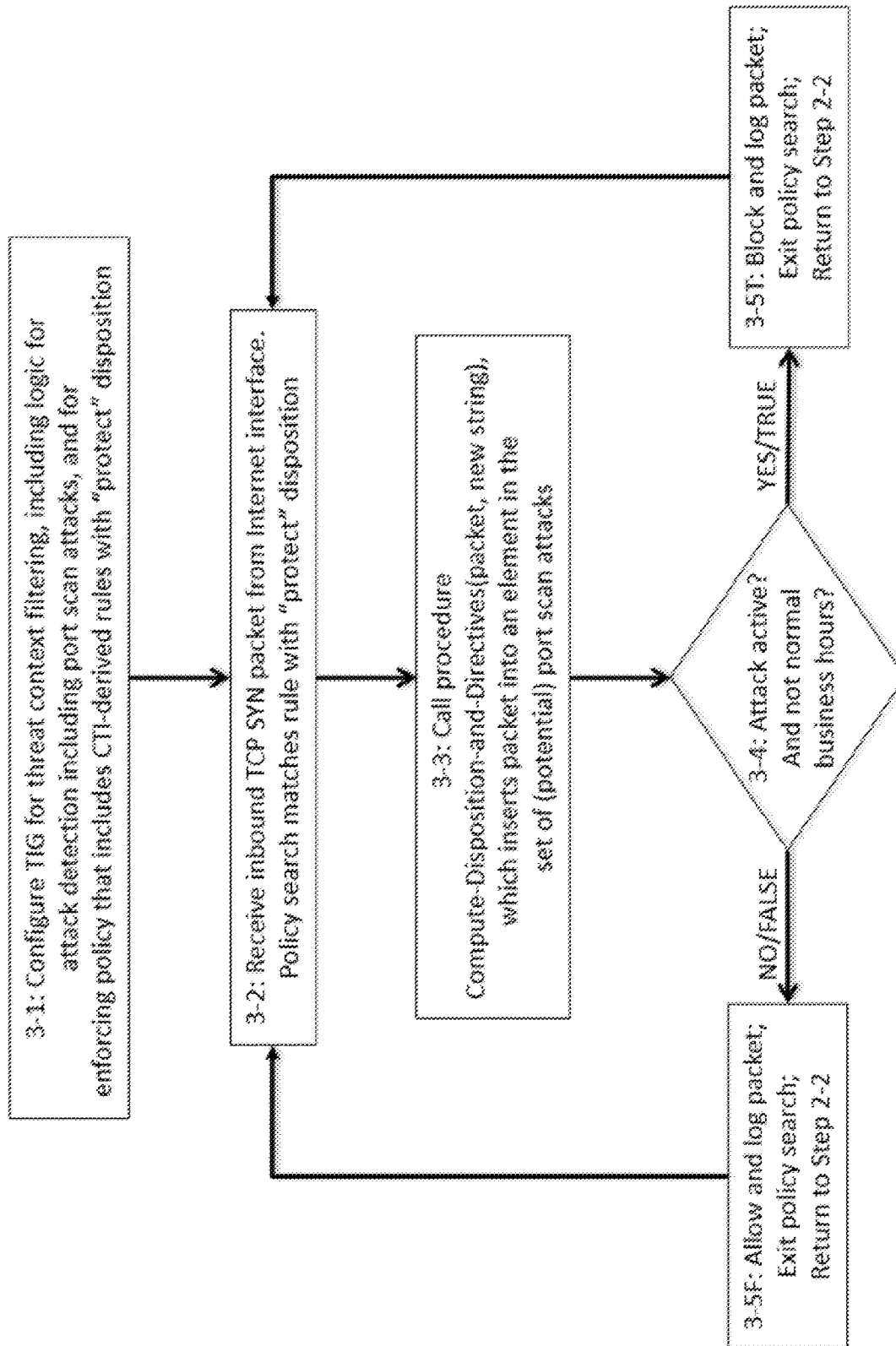
FIG. 3 is a flowchart describing a packet filtering appliance's exemplary use of threat context information associated with active attacks to compute dispositions and directives for in-transit packets.

Whether or not an attack is determined to be active or not (when the in-transit packet is observed) may be important threat context information for determining the disposition and directives of a packet that may match a packet filtering rule. FIG. 3 is a flowchart describing an exemplary use of threat context information associated with active attacks, for example port scan attacks (an example of a multi-packet, multi-flow attack), to compute dispositions and/or directives for an exemplary in-transit packet. The process indicated by the flowchart is described with reference to particular devices (e.g., TIG 120a), however the process may be performed by, or in communication with, any other devices (e.g., any of the other TIGs 120).

Referring to FIG. 3: In Step 3-1, TIG 120a protecting network 102 may be configured with logic that may use one or more types of threat context information to compute dispositions and directives for in-transit packets in order to protect network 102 from threats associated with Internet hosts. The threat context information may include, for example: attack detection logic, such as logic for detecting port scan attacks, portsweep attacks, DDoS attacks, reflected spoofed attacks, etc.; current time of day, which may be used to determine the time that an in-transit packet is observed or otherwise received, and/or to compare that observed/received time with a predetermined timeframe such as normal business hours; context information specific to the owner/operator of the TIG; and/or the like. Other examples of threat context information are described elsewhere in this document. In one particular example, TIG 120a's port scan attack detection logic may be configured with threshold values of (for example) two (2) for the number of different ports indicating a port scan attack, and ten (10) packets per second for the attack rate. Other threshold values may be used. TIG 120*a*'s normal business hours may be configured to be the time interval between (for example) 7 AM and 6 PM (local time). TIG 120*a* also may be configured with a policy received from an SPMS 150 that may contain packet filtering rules with matching criteria corresponding to threat indicators derived from CTI. One of these threat indicators may correspond to a particular IP address, for example 22.22.22.22, of a host connected to a particular network such as network 130. The disposition of the rule with matching criterion 22.22.22.22 may be "protect", which signals the TIG 120*a* to apply logic that factors in threat context information to compute the disposition and/or directives to be applied to an in-transit packet.

In a first iteration of Step 3-2, the TIG 120*a* receives a first inbound packet (referred to herein as "P0") containing a TCP SYN on one of its Internet interfaces at a particular time, e.g., 3 AM local time (i.e., 03:00:00:00). This packet P0 may have been sent by a particular host, e.g., the host 22.22.22.22, that may have been infected with malware for conducting port scan attacks. Thus, P0's source IP address is 22.22.22.22, the destination IP address is 11.11.11.11, which may be a public IP address associated with network 102, and the destination port is 22 (the well-known port for the Secure Shell (SSH) service). The TIG 120*a* searches the policy for a rule that matches P0 and finds a rule with matching criteria 22.22.22.22 and with a "protect" disposition. The "protect" disposition signals the TIG 120*a* to use threat context information and associated logic to compute the disposition and/or directives that may be applied to the packet (assuming no other matching rules override the computed disposition).

In a first iteration of Step 3-3, the TIG 120*a* logic may determine that P0 is inbound (relative to network 102) and includes a TCP SYN flag, and based on this may determine that P0 may be a component of a port scan attack. Accordingly, the logic invokes the procedure Compute-Disposition-and-Directives(P0, new string disposition and directives). The procedure calls the Boolean function Member-Active-Port-Scan-Attack(P0), which determines that the packet P0 may be the first packet of a new (potential) port scan attack because, for example, it is not a member of an existing (potential) port scan attack (e.g., the subfunction Member (key, P0) returned FALSE). Accordingly, a new element/port scan attack instance is created from P0 (by invoking the procedure Insert(key, P0, new element( ))) and is inserted into the local set data structure that manages (potential) port scan attacks. This new element may be populated with initial values that may be derived from the initial packet and environment, for example, the key may be set to or otherwise generated based on 22.22.22.22 (or 22.22.22.00/24), the value of the parameter for the current number of packets comprising the attack may be initialized to 1, the value of the parameter for the number of different ports scanned by the attack may be initialized to 1, the value of the parameter for the number of different destination IP addresses scanned by the attack may be initialized to 1, the value of the current rate parameter may be set to 0, the start time of the attack may be set to 3 AM local time (i.e., 03:00:00:00), and so on. It may also be useful to generate a (unique) attack identifier that may be associated with this new element/new (potential) attack instance.

In a first iteration of Step 3-4, during the Member-Active-Port-Scan-Attack( ) function call, the value of the parameter for number of different ports scanned by the attack and the value of the current rate parameter are compared to their associated threshold values. Because neither parameter value exceeds the corresponding threshold value in this example, the attack is determined to not be active; thus, the Member-Active-Port-Scan-Attack( ) function returns FALSE. Also in the first iteration of Step 3-4, the function Normal-Business-Hours(03:00:00:00) is called, which returns FALSE. Thus, the logic "(Member-Active-Port-Scan-Attack(P0) AND NOT(Normal-Business-Hours(current-time( ))))" returns NO/FALSE; therefore, the Disposition-and-Directives string is set to "allow, log, quick".

Accordingly, in Step 3-5F, the TIG 120*a* logic allows/forwards the packet P0 toward the destination 11.11.11.11, logs the packet, and exits the policy search (because of the "quick" directive). Upon completing the processing of packet P0, the logic program control is returned to Step 3-2 in order to process the next packet arriving at an interface of TIG 120*a*.

In a second iteration of Step 3-2, in this example the TIG 120*a* receives a second inbound packet ("P1") containing a TCP SYN on one of its Internet interfaces 0.01 seconds after P0 arrived at 3 AM local time (i.e., P1 arrives at 03:00:00:01). This packet P1 may have been sent by the host 22.22.22.22 that may have been infected with malware for conducting port scan attacks. Thus, P1's source IP address is 22.22.22.22, the destination IP address is 11.11.11.11, a public IP address associated with network 102, and the destination port is 23 (the well-known port for the Telnet service). The TIG 120*a* searches the policy for a rule that matches P1 and finds a rule with matching criteria 22.22.22.22 and with a "protect" disposition (for example, the same rule matched by packet P0 above in the first iteration of Step 3-2). The "protect" disposition signals the TIG 120*a* to use threat context information and associated logic to compute the disposition and/or directives that may be applied to the packet.

In a second iteration of Step 3-3, the TIG 120*a* logic determines that P1 is inbound (relative to network 102) and includes a TCP SYN flag, which indicates that P1 may be a component of a port scan attack. Accordingly, the logic invokes the procedure Compute-Disposition-and-Directives (P1, new string disposition and directives). The procedure calls the Boolean function Member-Active-Port-Scan-Attack(P1), which determines that the packet P1 may be a member of an existing (potential) port scan attack (e.g., the subfunction Member(key, P1) returned TRUE). Accordingly, a side effect of the Member( ) function is to insert/integrate the packet P1 into the element representing the (potential) port scan attack. For example, the value of the parameter for the current number of packets comprising the attack may be incremented by 1 to 2 (representing a total of two received packets associated with the potential attack), the value of the parameter for the number of different ports scanned by the attack may be incremented by 1 to 2 (representing a total of two different ports associated with the potential attack), the value of the parameter for the number of different destination IP addresses scanned by the attack remains set to 1 (representing a total of one destination IP address associated with the attack), the value of the current rate parameter may be computed to be 100 (with units of packets per second, because P1 arrived 0.01 seconds after P0) (representing a packet rate associated with the attack), and so on.

In a second iteration of Step 3-4, during the Member-Active-Port-Scan-Attack( ) function call, the value of the parameter for number of different ports scanned by the attack and the value of the current rate parameter are compared to their associated threshold values. Because both parameter values match or exceed their corresponding threshold values, the attack is determined to be active; thus, the Member-Active-Port-Scan-Attack( ) function returns TRUE. Also in the second iteration of Step 3-4, the function Normal-Business-Hours(03:00:00:01) is called, which returns FALSE. Thus, the logic "(Member-Active-Port-Scan-Attack(P1) AND NOT(Normal-Business-Hours(current-time( ))))" returns YES/TRUE; therefore, the Disposition-and-Directives string is set to "block, log, quick".

Accordingly, in Step 3-5T, the TIG 120a logic blocks/drops the packet P1, thereby protecting the network 102 from the (active) port scan attack, logs the packet, and exits the policy search (because of the "quick" directive). Upon completing the processing of packet P1, the logic program control is returned to Step 3-2 in order to process the next packet arriving at an interface of TIG 120a. The process of FIG. 3 may be repeated for each subsequent arriving packet.

Note that the above methods for efficiently determining a packet's threat context association with port scan attacks may be readily adapted to other types of attacks with other (e.g., similar) characteristics (e.g., multiple different flows), for example, portsweep attacks, certain DDoS attacks, etc. Also, the methods are not restricted/limited to packets that may match packet filtering rules with matching criteria corresponding to threat indicators associated with CTI or corresponding to particular timeframes (e.g., by comparing in-transit packet observation time with a known timeframe such as business hours). For example, a packet filtering rule that matches on any inbound packet containing a TCP SYN flag, for example an unsolicited TCP connection attempt, may be used to detect packets that may be part of a port scan attack. Conversely, such detectors may be adapted, for example, to track outbound TCP SYN packets that may be sourced by an internal host that is the source of port scan attacks or similar attacks. Such a host may have been compromised by malware for a port scan (or similar) attack application; therefore, upon detection, the associated network administrators may sweep and remove the malware from the host.

There may be multiple different attack detectors operating concurrently for different types of attacks. Moreover, in the exemplary descriptions above, CTI-derived packet filtering rules may be used to identify packets that may be associated with threats and may be components of these attacks, but these attack detectors also may be used to detect potential and/or active attacks being executed by packets that may not have been identified by CTI-derived packet filtering rules.

The threat context-aware packet filtering of the present disclosure may also be used to mitigate some significant operational issues that often occur in practice. As noted above, it may be desirable to be able to perform CTI noise exclusion at in-transit packet observation time. Some examples of CTI Noise include:

CTI listing an IP address that hosts a plurality of domains, where one or more of the domains may be desirable (e.g., considered non-threatening) and one or more others of the domains may be undesirable (e.g., associated with potential or actual threats). For example, Content Delivery Network (CDN) providers often host many domains (e.g., hundreds or thousands) on a single IP address X. If some (small) portion of the domains are determined to be threats by some CTI Provider, then the CTI Provider may include not only the domains in their published CTI but also the single IP address X hosting the threat domains (and the legitimate domains). Thus, each domain hosted on the IP address X, including the non-threat/legitimate domains, becomes associated with a threat. An SPMS 150 may include the IP address X in a packet-filtering rule as the matching criteria, and then may include the rule in a policy distributed to TIGs 120, such as TIG 120a protecting network 102. If the rule's disposition is "block", then it is likely that many legitimate business communications between network 102 and the CDN will be blocked, i.e., there may be many false positives. If the rule's disposition is "allow" and one of the directives is "log" (as an alert for a possible threat), then it is likely that many false alerts will be generated. In either case, the IP address X may be considered "CTI noise";

CTI listing a domain that is popular, such as a social media platform. For another example, often the most popular domains on the Internet (for example, as measured by the rate of DNS resolution requests) are listed in CTIPs' CTI feeds. This may occur because, for example, popular social media platforms are often used as attack vectors by malicious actors, resulting in URI threat indicators. Similar to the CDN example above, a CTIP may publish as CTI not only a URI but also the associated domain name, which will result in many false positives and false alerts. Such domain names may be considered "CTI noise". A domain may be considered popular enough to constitute CTI noise if, for example, the domain is included in a list of popular domains, and/or if the domain is determined to have a popularity score that exceeds a threshold popularity score;

CTI associated with a particular location, a particular network, and/or a particular administrative context. As yet another example of CTI noise that may be localized or otherwise specific to a particular network, i.e., the location and/or administrative context may be factored into network protection decisions: An enterprise may begin protecting its networks with one or more TIGs 120 and associated CTI-based policies but may immediately discover that the CTI and associated packet filtering rules include threat indicators that identify some portion or sometimes all of the enterprise's hosts as threats. If the disposition of the packet filtering rules is "block", then the affected enterprise hosts may be unable to conduct legitimate communications with Internet hosts. This particular CTI noise problem, which is referred to herein as the "autoimmunity problem" in analogy to biological autoimmunity issues such as when a biological organism's immune system may fail to recognize self and thus may attack self, may arise in practice because of the following exemplary scenario: Often, an enterprise network 102's public/WAN IP addresses, which may be assigned to a network boundary interfacing the enterprise network with the Internet 110, may be identified as threat indicators by CTI Providers because, for example, internal enterprise hosts may have been infected with malware or are otherwise controlled/compromised by malicious actors and may be participating in malicious activity over the Internet. Such activity may be detected by a CTIP 140, the CTIP 140 may identify the IP addresses and/or associated subnet address range of the compromised hosts as threat indicators, the indicators may be published in a CTI feed, the CTI feed may be ingested by an SPMS 150, the SPMS may transform the indicators into packet filtering rules with "block" dispositions, and the packet filtering rules may be included in a policy distributed to TIGs 120, including the TIG 120a protecting network 102. Then, legitimate communications between internal enterprise hosts connected to network 102 and Internet hosts may be blocked, which the enterprise may consider to be highly undesirable behavior.

For the above examples of CTI noise and autoimmunity, it is often difficult, impractical, or impossible to exclude/filter out the CTI noise at the CTIP(s) 140 and/or the SPMS(s) 150, because of, for example, the volume, dynamics, automation, lack of visibility and/or access, contextual differences particular to each subscriber, etc., associated with the generation/creation of CTI and CTI noise. Furthermore, CTI noise may be contextual, for example, one subscriber (e.g., an enterprise associated with a particular TIG 120 and/or a particular network such as TIG 120a and/or network 102) may consider a set of indicators to be noise (and not necessarily threats) whereas another subscriber (e.g., another enterprise associated with a different particular TIG 120 and/or a particular network such as TIG 120b and/or network 104) may consider the same set of indicators to be threats; or, for example, at one time an enterprise may consider a set of indicators to be threats, but later (e.g., when a TIG 120 observes an in-transit packet associated with that set of indicators) may consider the same set of indicators to be noise (and non-threatening).

The technology and methods of the present disclosure may be used to solve the CTI noise problem and autoimmunity subproblem. A general approach may be to identify CTI noise as threat context information to be determined at the TIG 120 in response to an in-transit packet, and include the threat context information in the TIG's 120 subsequent computation of dispositions and directives. Each TIG 120 may be configured with the local public/WAN IP addresses of the associated network boundary as threat context information, as well as with other indicators that are considered to be CTI noise by the administrators of each TIG 120. For example, TIG 120a may be configured with one or more local public/WAN IP addresses of the network boundary for network 102, and TIG 120b may be configured with one or more local public/WAN IP addresses of the network boundary for network 104. For example, the local public/WAN IP addresses and/or other indicators (e.g., IP addresses, domain names, URIs, and/or etc.) identified as CTI noise may be inserted in an efficient set data structure such as a Bloom filter, which may be efficiently tested (in response to observing an in-transit packet satisfying the rule) for element membership by the TIG 120 logic when the logic is processing a rule and matching packet. The threat indicator rules of the associated policy for any indicator identified as CTI noise may be configured with "protect" dispositions instead of "block" dispositions (or with some other disposition other than "allow" and "block"; or with no disposition at all such as a null disposition; or having any or no disposition and being associated with information such as a flag that the TIG 120 interprets as an instruction to use threat context information at in-transit packet observation time to determine a disposition). Then, for example, when such a rule (e.g., a "protect" rule) is matched by a packet, the matching threat indicator may be tested for membership in the efficient set data structure, and the membership test result (i.e., TRUE/is-a-member or FALSE/is-not-a-member) may be used as input into the computation of the disposition and directives. For example, a TRUE result may cause the TIG 120 logic to compute an "allow" disposition and the "log" and "continue" directives, whereas a FALSE result may cause the TIG 120 logic to compute a "block" disposition and the "log" and "quick" directives.

In further examples, the TIG 120 logic may be configured to factor in CTI noise and/or autoimmunity (e.g., always) regardless of an applicable rule's disposition. For example, the TIG 120 logic may be configured to always factor in CTI noise and/or autoimmunity when a "block" rule is matched by a packet, and may compute and apply a disposition and directive(s) accordingly. In effect, the semantics of a "block" disposition of a rule may change to, e.g., "block this packet except if the matching indicator is in the set of indicators associated with CTI noise and/or autoimmunity". Such a TIG 120 logic configuration may be useful, for example, when an associated SPMS may not provide for construction of rules with the "protect" disposition but protections from CTI noise and/or autoimmunity is a requirement. More generally, in some scenarios, it may be useful to have TIG 120 logic that factors in any threat context information, and not just CTI noise, when applying any rules, such as rules with "block" and/or "allow" dispositions. For example, the TIG 120 logic may not depend on a "protect" disposition of a rule to use threat context information to compute dispositions and directives. While various examples described herein use the "protect" disposition as a precursor to using threat context information and associated logic, TIG 120 may rely on any threat context information (including but not limited to CTI noise indicators) when applying any rules with any dispositions such as but not limited to "block" or "allow" dispositions. Thus, any examples described herein of using threat context information when applying a "protect" disposition rule may be likewise implemented when applying any other disposition of a rule, which may be substituted accordingly in these examples for re-computing or otherwise determining the rule's ultimate disposition and/or directive.

Referring to FIG. 1, when a packet originating from a host connected to network 102 matches a "protect" rule applied by the TIG 120a protecting network 102 (or, as mentioned just above, any other rule as desired), the associated TIG 120a logic may test if the matching indicator corresponds to the (local) CTI noise and/or autoimmunity threat context information (consisting of the local public/WAN IP addresses and possibly other CTI noise indicators) contained in the set data structure filter to determine that the computed disposition may be "allow" and a policy-processing directive may be "continue". Whereas, for a different network 104 with local public/WAN IP addresses that are not in CTI, and for packets comprising communications with hosts connected to network 102 that are filtered by the TIG 120b associated with network 104, the associated TIG 120b logic may determine the computed disposition to be "block" and the policy-processing directive to be "quick". Thus, network 102 and TIG 120a may allow legitimate communications between internal hosts and Internet hosts, but network 104 and TIG 120b may block malicious communications with the threat hosts connected to network 102.

Figure 4:
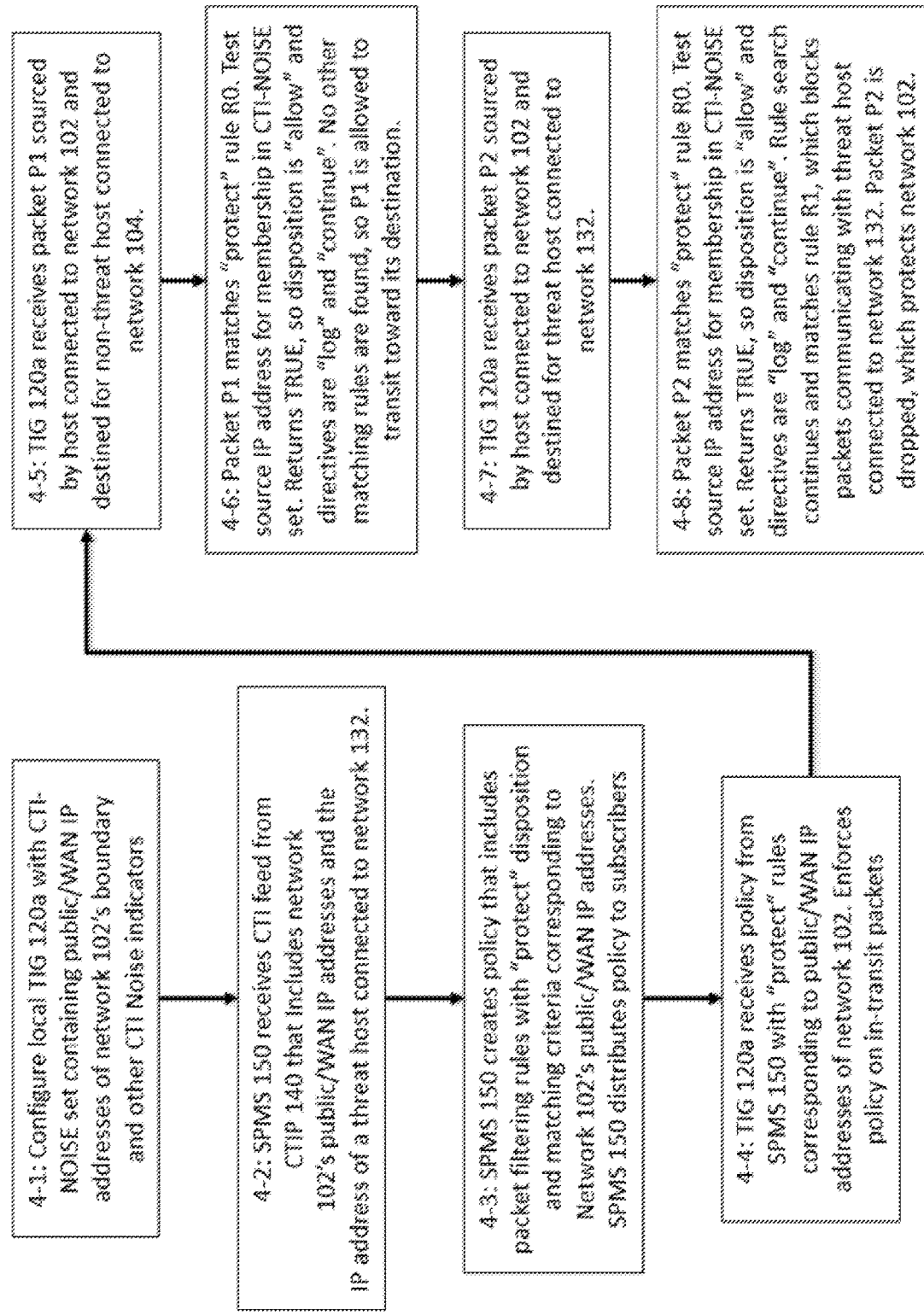
FIG. 4 is a flowchart describing exemplary use of threat context information to exclude cyber threat intelligence (CTI) noise and to prevent autoimmunity issues.

FIG. 4 shows a flowchart for an exemplary process that solves the autoimmunity problem and the more general CTI noise problem, i.e., performs CTI noise exclusion, at in-transit packet observation/filtering time using threat context information and associated methods of the present disclosure. FIG. 4 tracks the process for a TIG 120 such as TIG 120a protecting, for example, a (private) enterprise network 102. FIG. 4 also shows an example process for an SPMS 150 that may be providing policies and/or sets of packet filtering rules to the TIG 120a. Note that FIG. 4 may similarly apply to TIG 120b protecting network 104, and TIG 120c protecting network 108.

In Step 4-1, the (private) enterprise network 102's public/WAN IP addresses assigned to the network boundary with the Internet 110 (or other public network) are identified and configured as threat context information into the local TIG 120*a* protecting network 102 at the boundary. For example, the public/WAN IP addresses, as well as other CTI noise indicators (which may be, e.g., IP addresses, domain names, URIs, and/or etc.), may be inserted into a data set named CTI-NOISE, which may be an efficient set data structure, such as a Bloom filter, managed by the TIG 120*a*. The public/WAN IP addresses are typically assigned to the enterprise by its Internet Service Provider (ISP). Often, ISPs allocate IP addresses to subscribers as subnet addresses, which are blocks of contiguous IP addresses. For example, the (IPv4) subnet address 11.11.11.00/24, which may be assigned to the boundary of network 102, represents the block of 256 contiguous IP addresses ranging from 11.11.11.00 to 11.11.11.255. And often, enterprise networks are protected by network firewalls (not shown) located at the boundary that provide multiple functions including Network Address Translation (NAT). The NAT function may be embodied in a NAT gateway, or interface, device that translates between the private IP address space of the private network 102 and the public IP addresses assigned to network boundary. This way, internal hosts, which have private IP addresses assigned to them, may communicate with Internet hosts because the NAT will (temporarily) assign a public IP address to the internal host during Internet communications, which may be required for the communications' packets to route through the Internet. From the perspective of CTI and associated network protections systems, however, the NAT function may exacerbate the autoimmunity problem because, for example, a single compromised internal host may perform multiple (threat) communications that may be translated (by the NAT) into multiple different public IP addresses. A CTIP 140 may detect these multiple communications from multiple different IP addresses and may determine that an associated subnet address prefix, for example 11.11.11.00/24, is the threat indicator, and then publish the indicator/subnet address prefix in a CTI feed. In effect, this means that any Internet communication by any internal host may be perceived as a threat by subscribers to policies containing rules generated from the CTI feed— including the TIG 120*a* protecting the network 102.

In Step 4-2, an SPMS 150 may receive a CTI feed from a CTIP 140 that includes the public/WAN IP addresses of network 102 and identifies them as threat indicators. The CTI also identifies an IP address 66.66.66.66 (for example) associated with a host connected to network 132.

In Step 4-3, the rules and policy generation component of SPMS 150 creates one or more packet filtering rules with a "protect" disposition and with matching criteria corresponding to the public/WAN IP addresses (i.e., 11.11.11.00 through 11.11.11.255) of network 102 (which are threat indicators). For example, a rule R0 "protect 11.11.11.00/24" may be created. This rule R0 and other rules may be included in a policy that is distributed to subscribers, including TIG 120*a* protecting network 102. Alternatively, if TIGs 120 include logic to automatically check local set data structures for CTI noise indicators when a "block" rule is matched, then SPMS may create packet filtering rules with a "block" disposition and with matching criteria corresponding to the public/WAN IP addresses of network 102. Also, a rule R1 "block log quick 66.66.66.66" is created that succeeds rule R0 in the policy, i.e., a search through the policy may encounter rule R0 before encountering rule R1.

In Step 4-4, TIG 120*a* (protecting network 102) receives the policy distributed by SPMS 150 in Step 4-3. TIG 120*a* enforces the policy on in-transit packets crossing the boundary between network 102 and the Internet 110.

In Step 4-5, TIG 120*a* receives a packet P1 originated by an (internal) host A connected to network 102 with public IP address 11.11.11.01 (for example; assigned by, for example, a NAT located at the boundary of network 102 with the Internet 110) that is destined for a host B connected to network 104 and with a public IP address, for example, of 44.44.44.21. Thus, the packet P1's IP header incudes a source IP address value of 11.11.11.01 and a destination IP address value of 44.44.44.21. The IP address 44.44.44.21 of the (destination) host B is not in CTI; therefore, host B is not considered to be a threat and does not correspond with the matching criteria of any packet filtering rule in the policy being enforced by TIG 120*a*.

In Step 4-6, TIG 120*a* applies the current policy to packet P1 to determine whether a rule matches packet P1. In this example, TIG 120*a* applies the current policy to packet P1 and matches the rule R0 ("protect 11.11.11.00/24"), because P1's source IP address value is 11.11.11.01. The "protect" disposition signals TIG 120*a* to compute a disposition and/or directive(s) for P1 using at least threat context information, which includes the CTI noise indicators included in the CTI-NOISE indicator set data structure (e.g., a Bloom filter). Thus, TIG 120*a* may use threat context information to determine (e.g., compute) the disposition and/or one or more directives for P1, based on its determination that rule R0 is assigned the "protect" disposition. TIG 120*a* tests the set data structure for membership of the element 11.11.11.01, which is TRUE (because 11.11.11.01 was inserted into the CTI-NOISE set data structure in Step 4-1). The TRUE result may cause the TIG 120*a* logic to determine (a) the disposition to be "allow" for packet P1, and (b) the directives to be "log" and "continue" so that, for example, the autoimmunity instance may be alerted to administrators, and the packet P1 may continue to be filtered by rules in the policy. Because of the "continue" directive, TIG 120*a* continues to filter P1 through the remainder of the policy. No other matching rules are found (which may be because host B's IP address 44.44.44.21 is not in CTI); thus, P1's disposition is still "allow" and therefore TIG 120*a* applies the computed disposition and/or directive, and thus in this example forwards/allows P1 to transit toward its destination (i.e., the IP address 44.44.44.21). If rule R0 had instead been "allow 11.11.11.00/24" or "block 11.11.11.00/24," then the predetermined indicated "allow" or "block" disposition (respectively) may have instead been applied to packet P1 without the need for determining threat context information. Thus, TIG 120*a* may decide whether or not to determine threat context information for an observed in-transit packet, based upon a disposition indicated by a rule associated with (e.g., matching) that packet.

In Step 4-7, TIG 120*a* receives a packet P2 originated by a host A connected to network 102 with public IP address 11.11.11.01 that is destined for a host D connected to network 132 and with a public IP address, for example, of 66.66.66.66. Thus, the packet P2's IP header incudes a source IP address value of 11.11.11.01 and a destination IP address value of 66.66.66.66. As noted in Step 4-1, the IP address 66.66.66.66 of the (destination) host D is in CTI; therefore, host D is considered to be a threat and corresponds with the matching criteria of packet filtering rule R1 in the policy being enforced by TIG 120*a*.

In Step 4-8, TIG 120*a* applies the current policy to packet P2 and matches the rule R0 ("protect 11.11.11.00/24"), because P2's source IP address value is 11.11.11.01. The "protect" disposition signals TIG 120*a* to compute a disposition and directives for P2 from threat context information, which includes the CTI noise indicators included in the CTI-NOISE indicator set data structure. TIG 120a tests the set data structure for membership of the element 11.11.11.01, which is TRUE (because 11.11.11.01 was inserted into the set data structure CTI-NOISE in Step 4-1). The TRUE result may cause the TIG 120a logic to determine (a) the disposition to be "allow" for packet P2, and (b) the directives to be "log" and "continue" so that, for example, the autoimmunity instance may be alerted to administrators, and the packet P2 may continue to be filtered by rules in the policy. Because of the "continue" directive, TIG 120a continues to filter P2 through the remainder of the policy. P2 matches rule R1, which is "block log quick 66.66.66.66". Accordingly, the policy search halts because of the "quick" directive, the packet P2 is logged because of the "log" directive, and the packet P2 is dropped because of the "block" disposition. Thus, network 102 may be protected from certain external threats.

With respect to threat context information used to determine a packet's disposition and directives, the methods described above in association with FIG. 3 and FIG. 4 may be characterized as "local". This is because the threat context information in these examples is derived from both the current in-transit packet being processed by a TIG 120 as well as local environmental information that is determined by (e.g., available to and/or computed by) the TIG 120 after the in-transit packet is received by the TIG 120. Network protection may be further improved, however, if global threat context information, for example global threat situation and awareness information on threats/attacks that may be actively occurring and/or may have recently occurred on other networks besides the network being protected by the (local) TIG, may be used by the local TIG 120 to determine a packet's disposition and directives. This global threat context information may be particularly useful for attacks in which a malicious actor may be attacking multiple different networks as part of a single campaign. Such global threat context information may be collected and distributed by, for example, what is referred to herein as a Global Threat Context System/Service composed of one or more Global Threat Context Servers (GTCS(s)) 170 (see FIG. 1). The TIGs 120 may not only provide/push their own global threat context information to GTCS(s) 170 but also receive/pull other TIGs' global threat context information from GTCS(s) 170.

Figure 5:
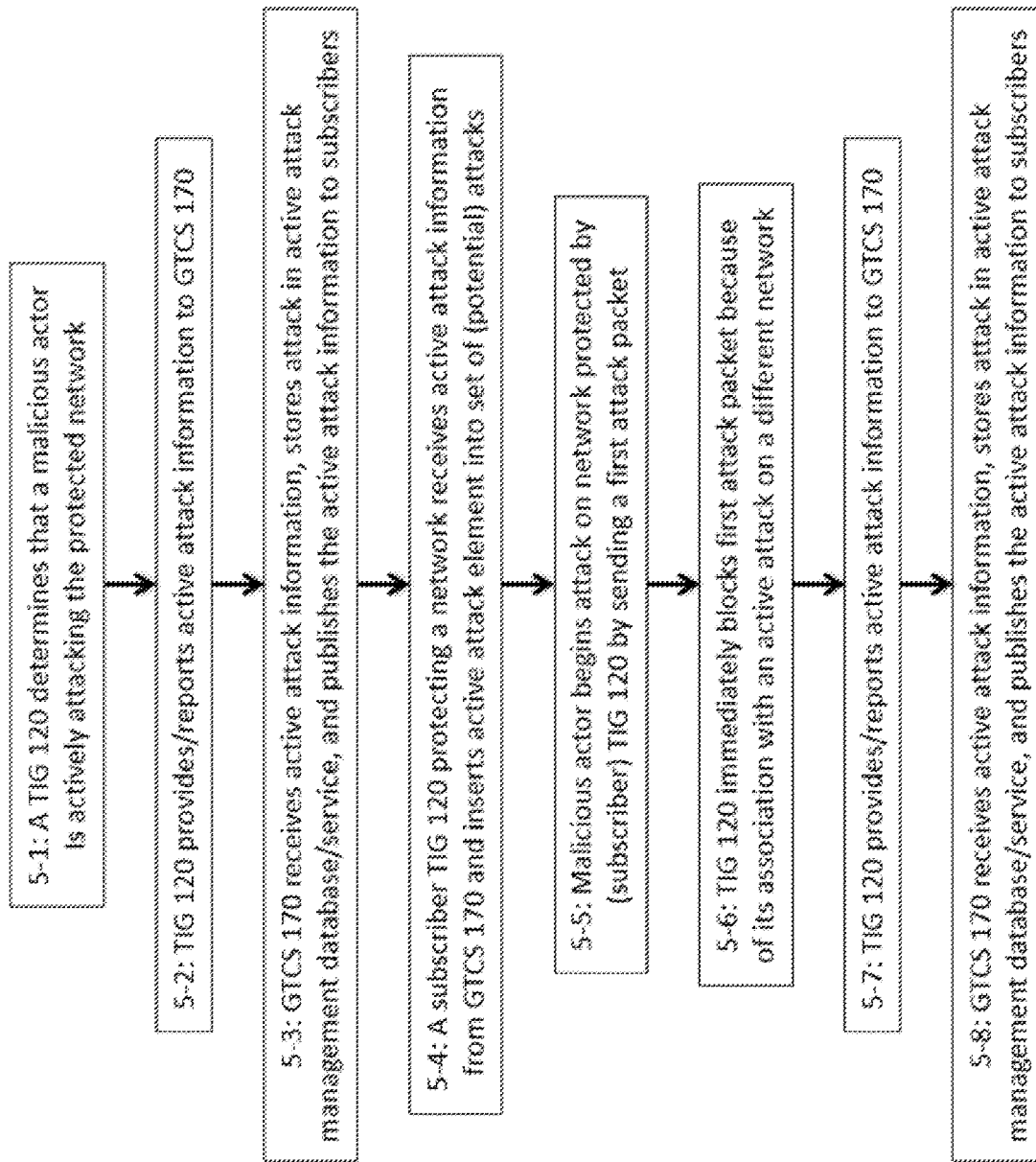
FIG. 5 is a flowchart describing exemplary use of global threat context information to compute dispositions and directives.

For example, referring to FIG. 5 and Step 5-1, consider a TIG 120, such as TIG 120a in Step 3-4 of FIG. 3, that may determine that a potential attack, for example a potential port scan attack, has transitioned to an active attack. For example, the host with IP address 22.22.22.22 associated with network 130 may be port scanning the network 102 that is protected by TIG 120a. At some point during the attack, the TIG 120a may determine that an active port scan attack is occurring against network 102, for example as in Step 3-5T of FIG. 3 above.

In Step 5-2, the TIG 120, for example TIG 120a, may provide a GTCS 170 with characteristic information on the attack, which may include, for example, the key (e.g., the IP address 22.22.22.22 or subnet address range 22.22.22.00/24 of the host(s) sourcing the attack), the type of attack (e.g., port scan attack), the start time of the attack (e.g., 3 AM), the network being attacked (e.g., identified by the subnet address prefix 11.11.11.00/24 of network 102), the disposition and/or directives applied to the packets, the matching rule or rules and associated metadata, and/or the like. TIG 120a may provide the information to GTCS 170, for example, on a periodic basis and/or in response to an event occurring such as a certain number of packets being observed that match a particular rule or a particular key, or in response to detecting the attack.

In Step 5-3, the GTCS 170 may receive the active attack information from TIG 120a, store the attack (such as in a database and associated service for managing active attacks information), associate a (globally unique) identifier/ID with the attack, and publish the characteristic information and identifier to GTCS subscribers such as TIG 120a, TIG 120b, other TIGs 120 for other networks, and/or other devices and systems (further examples of these subscribers are discussed below).

In Step 5-4, a TIG 120 that subscribes to the GTCS 170 and that is a different TIG protecting a different network than the TIG described in Step 5-2, for example the TIG 120b protecting network 104 with subnet address range 44.44.44.00/24, may receive from the GTCS 170 the (global) threat context information about the active port scan attack that was detected and provided by TIG 120a (in Step 5-2). The TIG 120b may create a new active attack element from the information and insert the element into the (local, efficient) set data structure for managing/tracking potential port scan attacks. This new element may be configured such that an Is-Active-Attack(key) function that may be associated with the set data structure returns TRUE when the key parameter value corresponds to the key for the new element.

In Step 5-5, the host 22.22.22.22 begins to attack network 104, which is protected by TIG 120b, by sending a first TCP SYN packet to a public IP address and port of network 104.

In Step 5-6, the TIG 120b protecting network 104 receives a (e.g., the first) TCP SYN packet sent by the host 22.22.22.22. TIG 120b may apply a policy to the packet and may match the packet to a "protect" rule that may have a CTI-derived threat indicator corresponding to IP address 22.22.22.22 as the matching criteria, and/or may have matching criteria corresponding to inbound TCP SYN packets. In either case, in response to determining that the matching rule has a "protect" disposition, the TIG 120b logic may call the procedure Compute-Disposition-and-Directives(key), with the "key" indicated for that procedure being the host address 22.22.22.22 or the associated subnet address prefix, for example, 22.22.22.00/24. Because of the configurations performed in Step 5-4 that resulted from the global threat context information about IP address 22.22.22.22, the computed disposition for this first TCP SYN packet may be "block". Note that without the global threat context information and associated actions, the computed disposition for this first TCP SYN packet may have been "allow".

In Step 5-7, which is similar to Step 5-2 except for a different TIG protecting a different network, another TIG such as TIG 120b may provide a GTCS 170 with (additional) characteristic information on the attack, which may include, for example, the key (e.g., the IP address 22.22.22.22 or subnet address prefix 22.22.22.00/24 of the host(s) sourcing the attack), the type of attack (e.g., port scan attack), the start time of the attack (e.g., soon after 3 AM), the network being attacked (e.g., identified by the subnet address prefix 44.44.44.00/24 of network 104), the attack identifier (which may have been supplied earlier by the GTCS 170), and/or the like. TIG 120b may provide the information to GTCS 170, for example, on a periodic basis and/or in response to an event occurring such a certain number of packets being observed that match a particular rule or a particular key, or in response to detecting the attack.

In Step 5-8, the GTCS 170 may receive the active attack information from TIG 120b, store and/or update the attack in its above-mentioned database and associated service for managing active attacks information, and publish the (updated) characteristic information to the GTCS subscribers. The updated characteristic information is then available for use by any of the TIGs 120 in subsequent iterations of Step 5-4 for subsequent observed packets by any of the TIGs 120.

In addition to TIGs 120 that are protecting networks, GTCS 170 subscribers may include, for example, (global) network threat situational awareness systems, CTI Providers, Internet Service Providers (ISPs), Managed Security Service Providers (MSSPs), Network Security-as-a-Service (NSaaS) providers, and the like. Furthermore, the information collected and distributed by the GTCS(s) 170 may be associated with many different types of attacks (and not necessarily limited to only the port scan attack example described above). Accordingly, TIG logic (or any other GTCS subscriber) may use the global threat context information associated with many different attacks to protect networks from these many different attacks.

As described above/elsewhere in this document, there are many potential sources and types of threat context information, as well as many possible combinations thereof, that may be used to determine an in-transit packet's disposition and directives. Furthermore, the characteristics of the cyber-threat and corresponding threat context change/evolve over time. As the number of sources and combinations of threat context information increases and the characteristics of the threat and the associated threat context change/evolve, it may be impractical for humans to design and manually program the associated TIG 120 logic to efficiently use threat context information. In such scenarios, machine learning may be used as an alternative and/or augmentative approach to creating and evolving at least a portion of the TIG 120 logic. For example, a machine-learned artificial neural network (ANN) may be created that has input nodes that correspond to multiple different sources/types of threat context information associated with the in-transit packet being filtered by a TIG 120, and that has output nodes that correspond to the disposition and the directives that may be applied to the packet. The ANN may be constructed in such a way, for example as a bounded-depth classifier, that the resultant logic for computing the disposition and directives may be highly efficient (for example, may have constant-time complexity). Furthermore, an ANN may be readily adapted to new and/or different threat context information and to new and/or different dispositions and directives by, for example, adding and/or modifying input nodes and output nodes.

Figure 6:
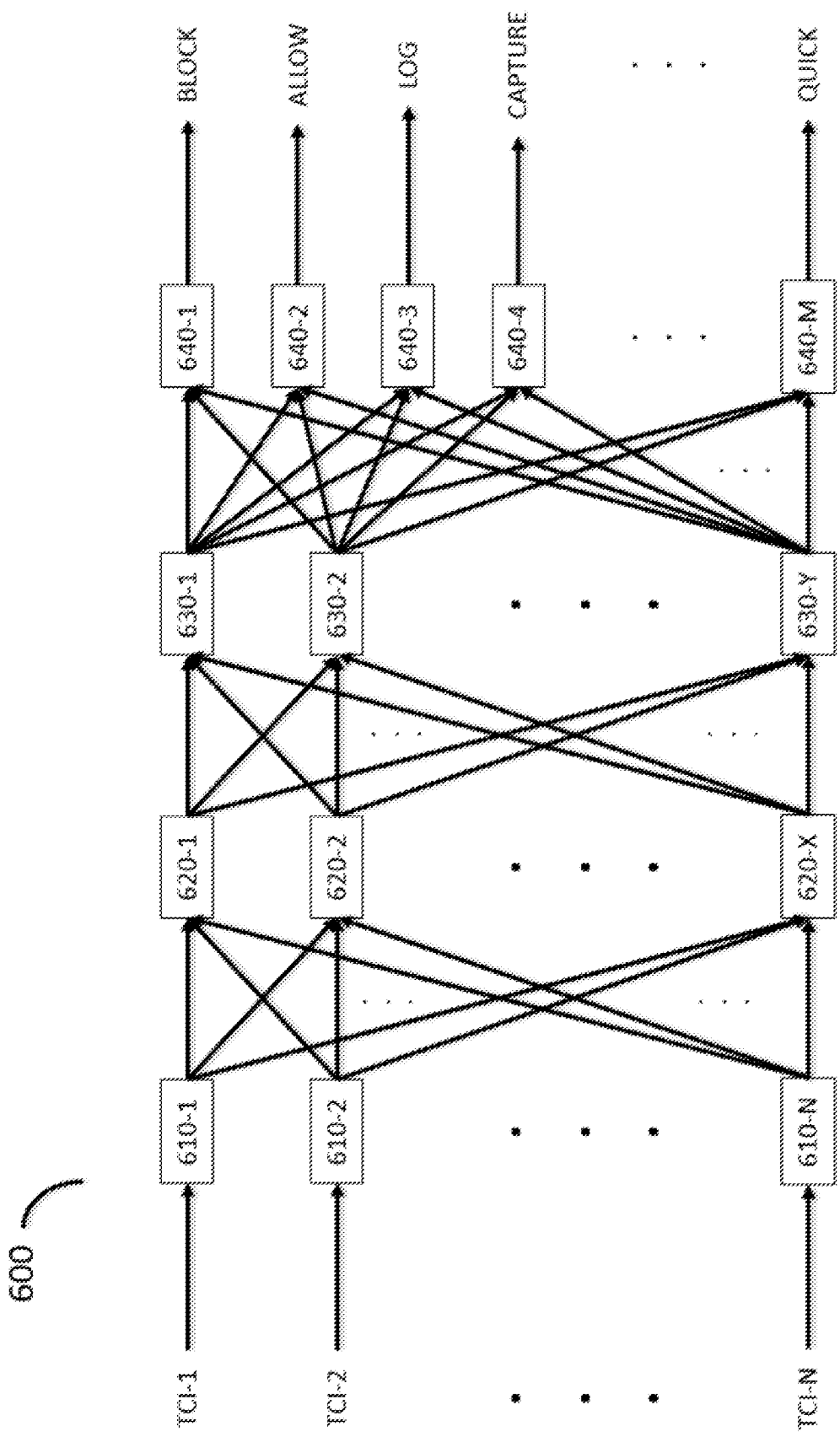
FIG. 6 shows an exemplary artificial neural network (ANN) that uses threat context information to efficiently compute disposition(s) and directives for in-transit packets.

FIG. 6 shows an exemplary ANN 600 that may embody machine-learned logic of a TIG 120 for computing an observed in-transit packet's disposition(s) and directive(s) based at least in part on threat context information associated with the in-transit packet. As shown, the ANN 500 may have a plurality of layers of nodes. For example, ANN 500 may have four (4) layers of nodes, including a first layer of N input nodes 610-1 through 610-N that may correspond to a plurality of (N) threat context information (TCI) sources and//or types, and a fourth layer of a plurality of (M) output nodes 640-1 through 640-M that may correspond to a plurality of dispositions and/or directives. M may be greater than, equal to, or less than N. The second (620-1 through 620-X) and third (630-1 through 630-Y) layers of nodes correspond to embedded or "hidden" layers. While two hidden layers are shown in this example, ANN 500 may have any number of hidden layers. Persons skilled in the art understand the general principles of artificial neural networks. As shown in FIG. 6, the output of each node in a layer of ANN 600 may be connected to the input of two or more nodes (e.g., each node) in the subsequent layer, i.e., each layer of nodes may be connected (e.g., fully connected) to the subsequent layer of nodes. Each connection between nodes may be weighted and directed such that the input to a node at a given layer (except possibly the first layer) may be a weighted sum of the outputs of two or more nodes (or every node) in the previous layer. Except for possibly nodes in the first layer, the output of each node may be the result of applying an activation function (which may be a non-linear function) to the node's input, such as a sigmoid function or a rectified linear unit (ReLU) function. The output of a node may be constrained to a value within a certain range of values, such as between 0 and 1 (inclusive). In the context of the present disclosure, the input values of the first-layer nodes may be computed efficiently and/or accessed efficiently, and the computations performed by nodes in the other layers also may be computed efficiently such that disposition(s) and/or directive(s) for the current in-transit packet may be efficiently determined by the ANN 600 and efficiently applied to the in-transit packet by the TIG 120 logic.

In FIG. 6, each (input) node in the first layer corresponds to a source and/or type of threat context information (TCI) that may be associated with an in-transit packet that is being filtered/observed by a TIG 120. For example, TCI-1 may comprise a value generated by a function associated with (e.g., producing the value based on) the observation time of the in-transit packet; TCI-2 may comprise a value generated by a function, where the value indicates whether the in-transit packet is a component of an active attack; TC-3 may comprise a value generated by a function associated with (e.g., producing the value based on) threat context information associated with the packet filtering rule that matched the in-transit packet; etc. The inputs to the nodes in the first layer, i.e., the values of TCI-1 through TCI-N, may be constrained to be binary valued, e.g., either 1 (TRUE) or 0 (FALSE), or may be constrained in another way such as to be in the range [0,1]. For example, and referring to threat context information and additional information examples described above, some exemplary threat context information and/or additional information that may be, or that may be used as a basis to generate, inputs to the first layer of nodes may include any one or more of the following:

Normal-Business-Hours(current-time( )): One or more inputs (such as one or more binary-valued inputs), which may be the output of a Boolean function that may efficiently determine if the current time/observation time of the in-transit packet occurs during a certain predetermined timeframe (e.g., the normal business operating hours of the organization that administrates the associated TIG 120 and protected network). Note that a similar exemplary function is described above in association with FIG. 3;

Is-Active-Attack( ): One or more inputs (such as one or more binary-valued inputs), which may be the output of a Boolean function that may efficiently determine whether the in-transit packet is part of an active attack on the network. A similar exemplary function is described above in association with FIG. 3. There may be other similar binary-valued input functions and input nodes associated with attack types, for example, a node for port-scan-attack, a node for port-sweep-attack, a node for exfiltration attack, one or more nodes for one or more DDoS attack types, etc.;

Threat-Indicator-Type-X: One or more inputs (such as one or more binary-valued inputs) indicating the type of threat indicator used as the matching criteria of the packet filtering rule that matched the in-transit packet. For example, threat indicator types may include IP address, subnet address range, 5-tuple, domain name, URI, etc., and associated input nodes may be labeled Threat-Indicator-Type-IP, Threat-Indicator-Type-Subnet-Address-Range, Threat-Indicator-Type-5-tuple, Threat-Indicator-Type-Domain-Name, Threat-Indicator-Type-URI, etc.;

Domain-Popularity: One or more inputs (such as one or more [0,1]-valued inputs) indicating the popularity of the domain name (if any) contained in the in-transit packet. Domain popularity data, which may be highly dynamic, is readily available from multiple services/providers and may be stored locally in efficient data structures for fast access. In general, domains with low popularity values are often associated with more threat risk than domains with high popularity values;

Domain Name and URI Characteristics: One or more inputs, such as (one or more binary-valued and/or [0,1]-valued inputs) associated with characteristics, for example syntactic or lexical characteristics, of the domain name and/or URI (if any) contained in the in-transit packet, which may be associated with threat risk. Syntactic or lexical characteristics may include, for example: string length, number of labels, number of numerical characters, number of URL-encoded characters, correlation with words from human-spoken languages, information entropy measures, top-level-domains (TLDs), etc.;

Direction (Inbound or Outbound): One or more inputs (which may be binary-valued) indicating whether the in-transit packet and/or the in-transit packet's associated flow may be inbound or outbound;

Connection-State: One or more inputs (such as one or more binary-valued inputs) indicating whether a TCP connection has been established for the flow associated with the in-transit packet;

Secondary Analysis Alerts: One or more inputs (such as one or more binary-valued inputs) indicating any results/outputs of threat/attack analyses of the flow associated with the packet, for example, whether the associated flow matched one or more signatures applied by an IDS/IPS, and/or an NBA system, etc. The analysis results may also include associated threat/attack information, such as attack types, that may also correspond to input nodes;

Global Threat Context Information: One or more inputs (such as one or more binary-valued inputs) that indicate any associations of the in-transit packet with global threat context information, such as active attacks on networks other than the local network being protected, the type of attack, etc. Exemplary global threat context information is described above in association with FIG. 5;

and/or the like. There may be additional inputs to the ANN 600 that may not be considered threat context information but are included as inputs in order to, for example, improve the performance of the ANN 600 by, for example, reducing false positives and/or false negatives and/or uncertain outputs/results. Such information may include, for example, CTI-Provider-X: One or more inputs (such as one or more binary-valued inputs) indicating whether a particular CTI Provider supplied the CTI threat indicator that may be used as the matching criteria of the packet filtering rule that matched the in-transit packet. CTI Provider information may be included in the matching rule's metadata and efficiently extracted/accessed at the time that the rule is matched by the in-transit packet. For each of the CTI Providers, there may be one such input node for ANN 600, and each such input node may be labeled accordingly as, e.g., CTI-Provider-1, CTI-Provider-2, . . . CTI-Provider-J. Similarly, there may be input nodes for CTI feed name/identifier, attack type associated with the CTI feed, recommended disposition associated with the feed (for example, supplied by the CTI Provider), confidence associated with the feed, and/or etc., where any of such information may also be included in the matching rule's metadata.

The output nodes 640-1 through 640-M may correspond to the computed disposition(s) and/or directive(s) that may be applied to the in-transit packet. For example, one output node may correspond to the "block" disposition, another output node may correspond to the "allow" disposition, another output node may correspond to the "log" directive, another output node may correspond to the "capture" directive, another output node may correspond to the "spoof-tcp-rst" directive, another output node may correspond to the "quick" directive for policy processing, etc. The output values may be constrained and/or trained to be in a particular range, such as in the range [0,1]. Accordingly, the output value for a given output node 640 may be considered a probability or likelihood of the corresponding disposition or directive being a good choice for protecting the associated network.

ANNs as the ANN 600 of FIG. 6 may use supervised learning methods and backpropagation for the training/learning algorithm. A training data set for the ANN 600 may be composed of many examples of {{input values}, {output values}} pairs, where the set {input values} may correspond to the threat context information input values (for example, $1^{st}$-layer node input values TCI-1 through TCI-N) associated with a training example packet, and the {output values} may correspond to the desired disposition and directives for the training example packet. During training, the {input values} may be input into the first layer of the ANN 600, and the actual output values (for example, the outputs of 640-1 through 640-M) may be compared to the desired {output values}. The differences between the desired {output values} and the actual output values may be used by a backpropagation algorithm to modify the weights of the connections between the nodes such that the differences may be less the next time the {input values} are input. Training and associated backpropagation may continue until convergence is obtained, i.e., the cumulative differences between desired {output values} and actual output values over the training data set may be acceptably small and accordingly the changes to weights during backpropagation may be acceptably small.

Upon completion of training, backpropagation/learning may be switched off, and the resultant ANN 600 may be referred to as a classifier or model. The ANN 600 classifier logic may be integrated with other portions of a TIG 120's logic, such as application logic, for computing disposition and/or directives for in-transit packets that match packet filtering rules (derived from CTI). For example, the ANN 600 classifier logic may be integrated into Step 3-3 and Step 3-4 of FIG. 3, and into Step 2-7 of FIG. 2. In practice, the ANN 600 classifier logic may be combined with other logic such as human-designed, manually programmed logic in order to, for example, implement default behavior, and/or handle false positives and false negatives produced by the ANN 600 classifier, and/or handle uncertain results produced by the ANN 600 classifier, and/or handle deficiencies in the training data and/or associated model, and the like. For example, when the "block" disposition output node's value is at or close to 1, then it may be desirable that the "allow" disposition output node's value should be at or close to 0, and vice versa. It may be the case, however, that both values are close to 1, or close to 0, or otherwise the values are indeterminate as to the selection of the "block" or "allow" disposition, in which case the manually programmed logic may be used to determine the disposition. For another example, the "allow" disposition output node's value may be at or close to 1 (and the "block" node's value close to 0) but the "spoof-tcp-rst" directive output node's value may also be close to 1, in which case manually programmed logic may intervene to allow/forward the associated packet but not send a TCP RST packet to the source of the packet. Otherwise, sending a TCP RST packet to the source may cause the associated TCP connection to be torn down, which may be a highly undesirable action.

Note that in addition to artificial neural networks (ANNs), other machine learning algorithms and methodologies may be used to design the decision logic, for example, evolutionary algorithms, genetic algorithms, genetic programming, and the like. The choice of an ANN in FIG. 6 is exemplary and not meant to exclude other machine learning approaches.

Figure 7:
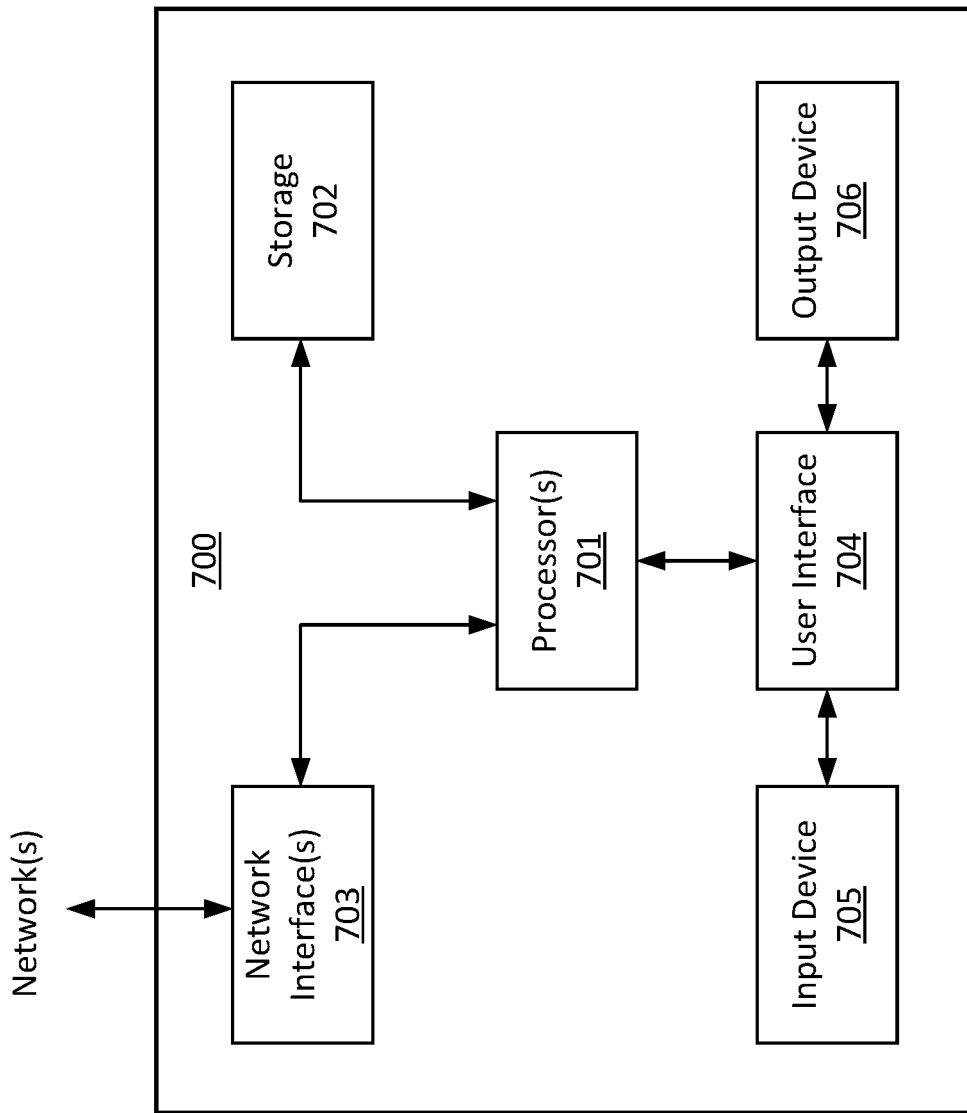
FIG. 7 shows an example computing device that may be used to implement any of the packet filtering appliances, other devices, systems, and methods described herein.

Any of the elements described herein or illustrated in any of the figures, such as any of TIGs 120, and such as any of elements 130, 132, 138, 140, 150, 160, and 170, may be partially or fully implemented using one or more computing devices such as computing device 700 shown in FIG. 7. Computing device 700 may be, for example, a general-purpose computing device with general-purpose hardware that is configured to perform one or more specific functions using specific software and/or firmware, or it may be, for example, a specific-purpose computing device with purpose-specific hardware (and/or purpose-specific software and/or purpose-specific firmware) customized for specific functionality. Any of the hardware elements of computing device 700, and/or the computing device 700 itself, may be emulated in a virtual version of computing device 700. Computing device 700 may include one or more processors 701 that may execute computer-readable instructions of a computer program to perform any of the functions or other operations described herein. The instructions, along with other data, may be stored in storage 702, which may include, for example, memory such as read-only memory (ROM) and/or random access memory (RAM), a hard drive, a magnetic or optical disk, a Universal Serial Bus (USB) drive, and/or any other type of computer-readable media. The data may be organized in any way desired, such as being organized so as to be accessible via database software stored as instructions in storage 702 and executed by the one or more processors 701. Computing device 700 may also include a user interface 704 for interfacing with one or more input devices 705 such as a keyboard, mouse, voice input, etc., and for interfacing with one or more output devices 706 such as a display, speaker, printer, etc. Computing device 700 may also include a network interface 703 for interfacing with one or more external devices that may be part of a network external to computing device 700. Although FIG. 7 shows an example hardware configuration, one or more of the elements of computing device 700 may be implemented as software or a combination of hardware and software. Modifications may be made to add, remove, combine, divide, etc. components of computing device 700. Additionally, the elements shown in FIG. 7 may be implemented using basic computing devices and components that have been configured to perform operations such as are described herein. Processor(s) 701 and/or storage 702 may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic.

Figure 8:
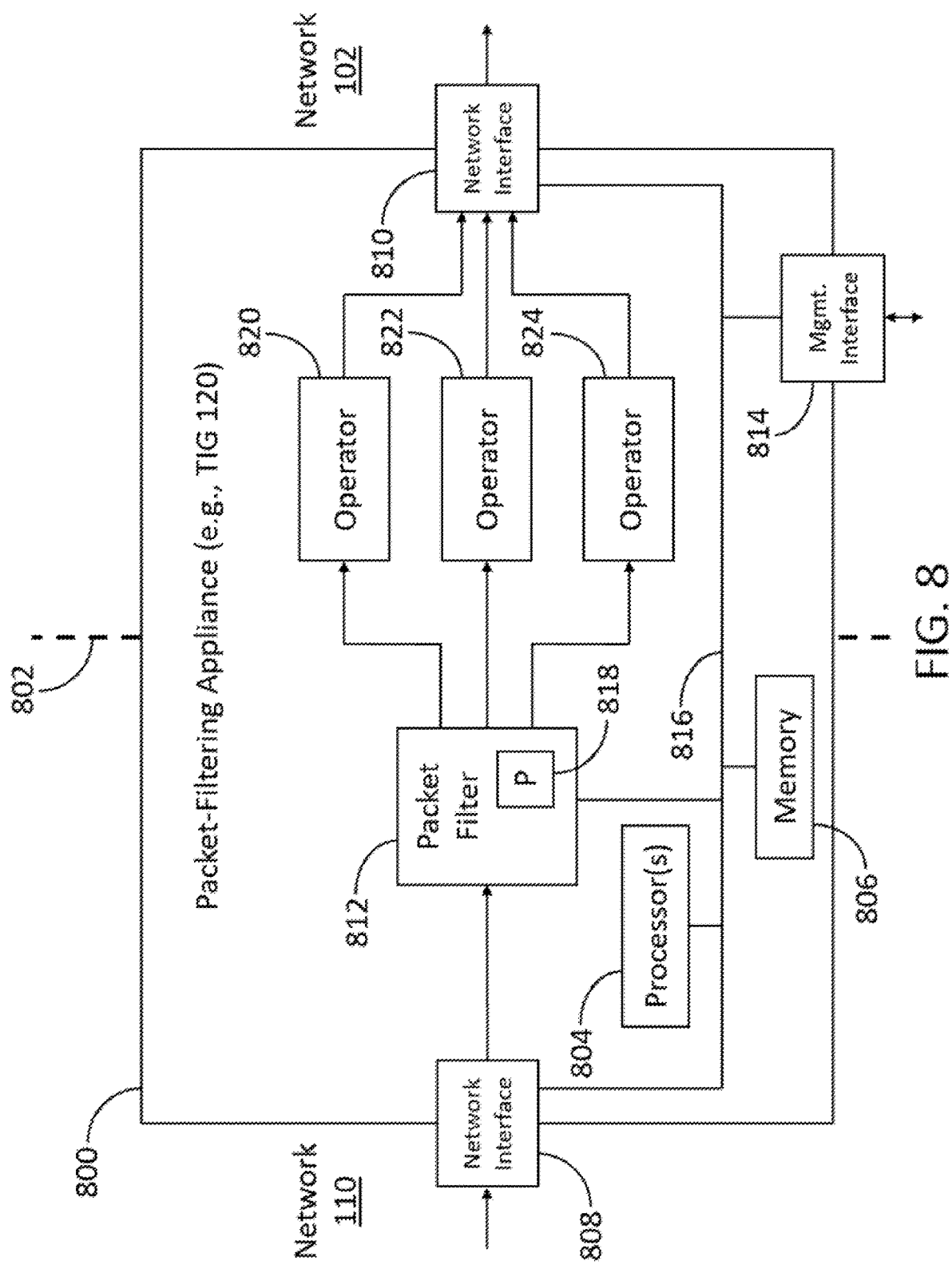
FIG. 8 shows an exemplary packet-filtering appliance such as a threat intelligence gateway (TIG).

As explained above, computing device 700 may be embodied, for example, as a packet-filtering appliance such as a TIG (e.g., any of TIGs 120). FIG. 8 shows an example block diagram of such a packet-filtering appliance 800, which may be located at a boundary 802 of a network such as network 102 (or, for example, networks 104 or 108). Thus, packet-filtering appliance 800 is one example implementation of computing device 700. Packet filtering appliance 800 may comprise one or more processors 804 (which may be the same as processor(s) 701), memory 806 (which may be the same as storage 702), network interface(s) 808 and/or 810 (which may be the same as network interface 703), packet filter 812 (which may be performed by processor(s) 701), and management interface 814 (which may be performed by processor(s) 701, user interface 704, input device 705, and/or output device 706). Processor(s) 804, memory 806, network interfaces 808 and/or 810, packet filter 812, and/or management interface 814 may be interconnected via a data bus 816 (which may be the arrows interconnecting any of the various elements in FIG. 7 and FIG. 8). Network interface 810 may connect packet filtering appliance 800 to a first network such as network 102 (or 104 or 108). Similarly, network interface 808 may connect packet-filtering appliance 800 to a second network such as network 110. Memory 806 may include one or more program modules that, when executed by processor(s) 804, may configure packet-filtering appliance 800 to perform one or more of various functions described herein. Memory 806 may also be used to store rules, databases, logs, and/or any other information used by and generated by packet-filtering appliance 800.

Packet-filtering appliance 800 may be configured to receive a policy (such as the filtering rules described herein) from one or more security policy management servers (e.g., SPMS(s) 150, shown in FIG. 1). For example, packet-filtering appliance 800 may receive a policy 818 from a security policy management server via management interface 814 (e.g., via out-of-band signaling) or network interface 808 (e.g., via in-band signaling). Packet-filtering appliance 800 may comprise one or more packet filters or packet discriminators, and/or logic for implementing one or more packet filters or packet discriminators. For example, packet-filtering appliance 800 may comprise packet filter 812, which may be configured to examine information associated with packets received by packet-filtering appliance 800 (e.g., from network 110) and forward such packets to one or more of operators 820, 822, and/or 824 (which may be implemented as hardware and/or as software executed by processor(s) 804) based on the examined information. For example, packet filter 812 may examine information associated with packets received by packet-filtering appliance 800 (e.g., packets received from network 110 via network interface 808) and forward the packets to one or more of operators 820, 822, or 824 based on the examined information. These operators, for example, may implement the disposition and directives associated with the packet filtering rule that match a packet.

Policy 818 may include one or more filtering rules, and the configuration of packet filter 812 may be based on one or more of the rules included in policy 818. For example, policy 818 may include one or more rules specifying that packets having specified information should be forwarded to operator 820, that packets having different specified information should be forwarded to operator 822, and that all other packets should be forwarded to operator 824. Operators 820, 822, and/or 824 may be configured to perform one or more functions on packets they receive from packet filter 812. For example, one or more of operators 820, 822, and/or 824 may be configured to forward packets received from packet filter 812 into network 102, which may implement an "allow" disposition, or drop packets received from packet filter 812, which may implement a "block" disposition. One or more of operators 820, 822, and/or 824 may be configured to drop packets by sending the packets to a local "infinite sink" (e.g., the/dev/null device file in a UNIX/LINUX system). In some embodiments, one or more of operators 820, 822, and/or 824 may be configured to apply directives to the packets, such as the "log", "capture", etc., directives described herein.

Also, one or more of operators 820, 822, and/or 824 may be configured to implement the "protect" disposition described herein, based on one or more filtering rules set forth in policy 818. For example, if one or more packets are determined by operator 822 to match or otherwise satisfy one or more rules that may be configured with a "protect" disposition, then operator 822 may send information to processor(s) 804 indicating this (e.g., indicating which rule (s) are satisfied, and/or indicating logging parameters that should be used). In turn, processor(s) 804 may initiate execution of logic that uses various threat context information described herein to compute the disposition and directive(s) that may be applied to the one or more packets. Processor(s) 804 may comprise and/or be supplemented with the ANN 600 discussed above with respect to FIG. 6, with the requisite physical and/or logical inputs to the input layer of nodes 610 and physical and/or logical outputs from the output layer of nodes 640.

Packet-filtering appliance 800 may obtain threat-context information from a variety of sources (or generate threat context information based on information retrieved from a variety of sources), some of which may be local (sources internal to packet-filtering appliance 800) and others of which may be remote (sources external to packet-filtering appliance 800). For example, processor(s) 804 may comprise a clock that maintains current time of day and that may be used to determine in-transit packet observation time. Referring to other examples of threat-context information described above: appliance location, appliance ID, administrator and associated security policy preferences, network type, active threat type, multi-packet multi-flow threat/attack analysis results, CTI provider(s) and associated information, threat indicator type and fidelity, threat indicator age, flow origination, flow direction, flow state, connection state, global threat context, domain name, URI, URL, domain name popularity, domain name registration status, data transfer protocol methods, protocol risk, contextual CTI noise, and the like may each be determined by processor(s) 804 for an in-transit packet and in response to receiving the in-transit packet, based on processing of information stored in memory 806, based on computations by processor(s) 804, based on information received via network interface 808 from network 110, based on information receive via network interface 810 via network 102, and/or based on information received via management interface 814.

In addition to the other information described above, memory 806 may store a variety of information used by packet-filtering appliance 800, for example CTI noise information, global threat context information received via network interface 810 from GTCS(s) 170, domain name popularity information), and/or any other information received from SOC(s) 160, SPMS(s) 150, and/or CTIP(s) 140.

The functions and steps described herein may be embodied in computer-usable data or computer-executable instructions, such as in one or more program modules, executed by one or more computers or other devices (e.g., computing device 700, such as packet-filtering appliance 800) to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium (e.g., storage 702, such as memory 806) such as a magnetic disk, optical disk, removable storage media, solid-state memory, random-access memory (RAM), ready-only memory (ROM), flash memory, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible. For another example, one of ordinary skill in the art will appreciate that the references to the IPv4 protocol in the specification and descriptions of illustrative figures may be substituted with references to other protocols such as the Internet Protocol version 6 (IPv6) protocol.

The invention claimed is:

1. A packet-filtering appliance comprising:
one or more processors; and
memory storing instructions that, when executed by the one or more processors, cause the packet-filtering appliance to:
  receive a plurality of packet-filtering rules each indicating one or more packet-matching criteria and one or more actions to be performed, wherein:
    the packet-filtering rules were generated based on a plurality of threat indicators that were previously determined based on a plurality of cyber threat intelligence reports from one or more cyber threat intelligence providers, wherein the plurality of cyber threat intelligence reports comprises the plurality of threat indicators, and wherein the plurality of threat indicators comprises a plurality of network addresses, and
    a first packet-filtering rule, of the plurality of packet-filtering rules, indicates a first directive and is associated with a disposition that is to be determined after an in-transit packet matching first one or more packet-matching criteria of the first packet-filtering rule is received;
  receive, from a first network and at a first time, a first in-transit packet destined to at least one location in a second network;
  based on determining that the first in-transit packet matches the first one or more packet-matching criteria of the first packet-filtering rule:
    determine first threat context information associated with receipt of the first in-transit packet by the packet-filtering appliance;
    determine, based on the first threat context information, a first disposition;
    selectively apply, based on the first disposition and to the first in-transit packet, the first directive of the first packet-filtering rule; and
    apply the first disposition to the first in-transit packet;
  receive, from the first network and at a second time, a second in-transit packet destined to at least one location in the second network; and
  based on determining that the second in-transit packet matches the first one or more packet-matching criteria of the first packet-filtering rule:
    determine second threat context information associated with receipt of the second in-transit packet by the packet-filtering appliance, wherein the second threat context information has at least one value different from the first threat context information;
    determine, based on the second threat context information and independently from the determining the first disposition, a second disposition different from the first disposition; and
    selectively apply, based on the second disposition and to the second in-transit packet, the first directive of the first packet-filtering rule; and
    apply the second disposition to the second in-transit packet.

2. The packet-filtering appliance of claim 1, wherein:
the first directive comprises a spoof-tcp-rst directive,
the first disposition comprises an allow disposition, and
the instructions, when executed by the one or more processors, cause the packet-filtering appliance to prevent, based on the first disposition, application of the first directive to the first in-transit packet.

3. The packet-filtering appliance of claim 2, wherein:
the second disposition comprises a block disposition, and
the instructions, when executed by the one or more processors, cause the packet-filtering appliance to apply, based on the second disposition, the first directive to the second in-transit packet.

4. The packet-filtering appliance of claim 1, wherein the instructions, when executed by the one or more processors, cause the packet-filtering appliance to selectively apply, based on the first disposition, the first directive to the first in-transit packet by:
selecting between applying the first directive to the first in-transit packet and preventing application of the first directive to the first in-transit packet, based on whether the first disposition is a block disposition or an allow disposition.

5. The packet-filtering appliance of claim 1, wherein the instructions, when executed by the one or more processors, further cause the packet-filtering appliance to:
determine, based on the first disposition, a second directive; and
apply the second directive to the first in-transit packet.

6. The packet-filtering appliance of claim 1, wherein the instructions, when executed by the one or more processors, cause the packet-filtering appliance to complete applying the first disposition to the first in-transit packet before the packet-filtering appliance applies the second disposition to the second in-transit packet.

7. The packet-filtering appliance of claim 1, wherein the instructions, when executed by the one or more processors, cause the packet-filtering appliance to determine the first threat context information based on an observation time of the first in-transit packet.

8. The packet-filtering appliance of claim 1, wherein the instructions, when executed by the one or more processors, cause the packet-filtering appliance to determine the first threat context information based on whether the first in-transit packet is a member of an attack that is active at a time that the first in-transit packet is received by the packet-filtering appliance.

9. The packet-filtering appliance of claim 1, wherein the instructions, when executed by the one or more processors, cause the packet-filtering appliance to determine the first threat context information based on whether the first in-transit packet is a member of a multi-packet multi-flow attack that is active at a time that the first in-transit packet is received by the packet-filtering appliance.

10. The packet-filtering appliance of claim 1, wherein:
the first threat context information comprises a first plurality of elements of information and the second threat context information comprises a second plurality of elements of information;
the packet-filtering appliance further comprises an artificial neural network comprising a plurality of input nodes and a plurality of output nodes;
the instructions, when executed by the one or more processors, cause the packet-filtering appliance to determine the first disposition, by at least:
  providing the first plurality of elements of information to at least some of the plurality of input nodes of the artificial neural network; and
  receiving, via at least one of the plurality of output nodes of the artificial neural network, an indication of the first disposition;
the instructions, when executed by the one or more processors, cause the packet-filtering appliance to determine the second disposition, by at least:

providing the second plurality of elements of information to at least some of the plurality of input nodes of the artificial neural network; and receiving, via at least one of the plurality of output nodes of the artificial neural network, an indication of the second disposition; and the instructions, when executed by the one or more processors, cause the packet-filtering appliance to:

determine, based on the indication of the first disposition from the artificial neural network, whether to implement the first directive for the first in-transit packet; and determine, based on the indication of the second disposition from the artificial neural network, whether to implement the first directive for the second in-transit packet.

11. A non-transitory computer-readable medium storing instructions that, when executed, configure a packet-filtering appliance to:

receive a plurality of packet-filtering rules each indicating one or more packet-matching criteria and one or more actions to be performed, wherein:

the packet-filtering rules were generated based on a plurality of threat indicators that were previously determined based on a plurality of cyber threat intelligence reports from one or more cyber threat intelligence providers, wherein the plurality of cyber threat intelligence reports comprises the plurality of threat indicators, and wherein the plurality of threat indicators comprises a plurality of network addresses, and a first packet-filtering rule, of the plurality of packet-filtering rules, indicates a first directive and is associated with a disposition that is to be determined after an in-transit packet matching first one or more packet-matching criteria of the first packet-filtering rule is received;

receive, from a first network and at a first time, a first in-transit packet destined to at least one location in a second network;

based on determining that the first in-transit packet matches the first one or more packet-matching criteria of the first packet-filtering rule:

determine first threat context information associated with receipt of the first in-transit packet by the packet-filtering appliance;

determine, based on the first threat context information, a first disposition;

selectively apply, based on the first disposition and to the first in-transit packet, the first directive of the first packet-filtering rule; and apply the first disposition to the first in-transit packet;

receive, from the first network and at a second time, a second in-transit packet destined to at least one location in the second network; and based on determining that the second in-transit packet matches the first one or more packet-matching criteria of the first packet-filtering rule:

determine second threat context information associated with receipt of the second in-transit packet by the packet-filtering appliance, wherein the second threat context information has at least one value different from the first threat context information;

determine, based on the second threat context information and independently from the determining the first disposition, a second disposition different from the first disposition; and selectively apply, based on the second disposition and to the second in-transit packet, the first directive of the first packet-filtering rule; and apply the second disposition to the second in-transit packet.

12. The non-transitory computer-readable medium of claim 11, wherein:

the first directive comprises a spoof-tcp-rst directive, the first disposition comprises an allow disposition, and the instructions, when executed, configure the packet-filtering appliance to prevent, based on the first disposition, application of the first directive to the first in-transit packet.

13. The non-transitory computer-readable medium of claim 12, wherein:

the second disposition comprises a block disposition, and the instructions, when executed, configure the packet-filtering appliance to apply, based on the second disposition, the first directive to the second in-transit packet.

14. The non-transitory computer-readable medium of claim 11, wherein the instructions, when executed, configure the packet-filtering appliance to selectively apply, based on the first disposition, the first directive to the first in-transit packet by:

selecting between applying the first directive to the first in-transit packet and preventing application of the first directive to the first in-transit packet, based on whether the first disposition is a block disposition or an allow disposition.

15. The non-transitory computer-readable medium of claim 11, wherein the instructions, when executed, further configure the packet-filtering appliance to:

determine, based on the first disposition, a second directive; and apply the second directive to the first in-transit packet.

16. The non-transitory computer-readable medium of claim 11, wherein the instructions, when executed, configure the packet-filtering appliance to initiate applying the first disposition to the first in-transit packet before processing the second in-transit packet.

17. The non-transitory computer-readable medium of claim 11, wherein the instructions, when executed, configure the packet-filtering appliance to complete applying the first disposition to the first in-transit packet before applying the second disposition to the second in-transit packet.

18. The non-transitory computer-readable medium of claim 11, wherein the instructions, when executed, configure the packet-filtering appliance to determine the first threat context information based on whether the first in-transit packet is a member of an attack that is active at a time that the first in-transit packet is received by the packet-filtering appliance.

19. The non-transitory computer-readable medium of claim 11, wherein the instructions, when executed, configure the packet-filtering appliance to determine the first threat context information based on whether the first in-transit packet is a member of a multi-packet multi-flow attack that is active at a time that the first in-transit packet is received by the packet-filtering appliance.

20. The non-transitory computer-readable medium of claim 11, wherein:

the first threat context information comprises a first plurality of elements of information and the second threat context information comprises a second plurality of elements of information;

the instructions, when executed, configure the packet-filtering appliance to determine the first disposition, by at least:
    providing the first plurality of elements of information to at least some input nodes of a plurality of input nodes of an artificial neural network; and
    receiving, via at least one output node of a plurality of output nodes of the artificial neural network, an indication of the first disposition;
the instructions, when executed, configure the packet-filtering appliance to determine the second disposition, by at least:
    providing the second plurality of elements of information to at least some of the plurality of input nodes of the artificial neural network; and
    receiving, via at least one of the plurality of output nodes of the artificial neural network, an indication of the second disposition; and
the instructions, when executed, configure the packet-filtering appliance to:
    determine, based on the indication of the first disposition from the artificial neural network, whether to implement the first directive for the first in-transit packet; and
    determine, based on the indication of the second disposition from the artificial neural network, whether to implement the first directive for the second in-transit packet.

21. A method comprising:
receiving, by a packet-filtering appliance, a plurality of packet-filtering rules each indicating one or more packet-matching criteria and one or more actions to be performed, wherein:
    the packet-filtering rules were generated based on a plurality of threat indicators that were previously determined based on a plurality of cyber threat intelligence reports from one or more cyber threat intelligence providers, wherein the plurality of cyber threat intelligence reports comprises the plurality of threat indicators, and wherein the plurality of threat indicators comprises a plurality of network addresses, and
    a first packet-filtering rule, of the plurality of packet-filtering rules, indicates a first directive and is associated with a disposition that is to be determined after an in-transit packet matching first one or more packet-matching criteria of the first packet-filtering rule is received;
receiving, by the packet-filtering appliance from a first network and at a first time, a first in-transit packet destined to at least one location in a second network;
based on determining that the first in-transit packet matches the first one or more packet-matching criteria of the first packet-filtering rule, the packet-filtering appliance performing:
    determining first threat context information associated with the receiving the first in-transit packet;
    determining, based on the first threat context information, a first disposition;
    selectively applying, based on the first disposition and to the first in-transit packet, the first directive of the first packet-filtering rule; and
    applying the first disposition to the first in-transit packet;
receiving, by the packet-filtering appliance from the first network and at a second time, a second in-transit packet destined to at least one location in the second network; and
based on determining that the second in-transit packet matches the first one or more packet-matching criteria of the first packet-filtering rule, the packet-filtering appliance performing:
    determining second threat context information associated with the receiving the second in-transit packet, wherein the second threat context information has at least one value different from the first threat context information;
    determining, based on the second threat context information and independently from the determining the first disposition, a second disposition different from the first disposition; and
    selectively applying, based on the second disposition and to the second in-transit packet, the first directive of the first packet-filtering rule; and
    applying the second disposition to the second in-transit packet.

22. The method of claim 21, wherein the first directive comprises a spoof-tcp-rst directive, the first disposition comprises an allow disposition, and the selectively applying, based on the first disposition, the first directive to the first in-transit packet comprises preventing application of the first directive to the first in-transit packet.

23. The method of claim 22, wherein the second disposition comprises a block disposition, and the selectively applying, based on the second disposition, the first directive to the second in-transit packet comprises applying the first directive to the second in-transit packet.

24. The method of claim 21, wherein the selectively applying, based on the first disposition, the first directive to the first in-transit packet comprises selecting between applying the first directive to the first in-transit packet and preventing application of the first directive to the first in-transit packet, based on whether the first disposition is a block disposition or an allow disposition.

25. The method of claim 21, further comprising:
    determining, based on the first disposition, a second directive; and
    applying the second directive to the first in-transit packet.

26. The method of claim 21, wherein the applying the first disposition to the first in-transit packet is completed before the packet-filtering appliance applies the second disposition to the second in-transit packet.

27. The method of claim 21, wherein the determining the first threat context information comprises determining the first threat context information based on an observation time of the first in-transit packet.

28. The method of claim 21, wherein the determining the first threat context information comprises determining the first threat context information based on whether the first in-transit packet is a member of an attack that is active at a time that the first in-transit packet is received by the packet-filtering appliance.

29. The method of claim 21, wherein the determining the first threat context information comprises determining the first threat context information based on whether the first in-transit packet is a member of a multi-packet multi-flow attack that is active at a time that the first in-transit packet is received by the packet-filtering appliance.

30. The method of claim 21, wherein:
- the first threat context information comprises a first plurality of elements of information and the second threat context information comprises a second plurality of elements of information;
- the packet-filtering appliance comprises an artificial neural network comprising a plurality of input nodes and a plurality of output nodes;
- the determining the first disposition comprises:
  - providing the first plurality of elements of information to at least some of the plurality of input nodes of the artificial neural network; and
  - receiving, via at least one of the plurality of output nodes of the artificial neural network, an indication of the first disposition;
- the determining the second disposition comprises:
  - providing the second plurality of elements of information to at least some of the plurality of input nodes of the artificial neural network; and
  - receiving, via at least one of the plurality of output nodes of the artificial neural network, an indication of the second disposition; and
- the packet-filtering appliance comprises logic configured to:
  - determine, based on the indication of the first disposition from the artificial neural network, whether to implement the first directive for the first in-transit packet; and
  - determine, based on the indication of the second disposition from the artificial neural network, whether to implement the first directive for the second in-transit packet.

* * * * *